US008448259B2

(12) United States Patent
Haga et al.

(10) Patent No.: US 8,448,259 B2
(45) Date of Patent: May 21, 2013

(54) CONTENT REPRODUCTION DEVICE, CONTENT REPRODUCTION DEVICE CONTROL METHOD, CONTENT REPRODUCTION PROGRAM, RECORDING MEDIUM, AND INTEGRATED CIRCUIT

(75) Inventors: Tomoyuki Haga, Nara (JP); Yoshikatsu Ito, Osaka (JP); Yuichi Futa, Osaka (JP); Hideki Matsushima, Osaka (JP); Takayuki Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/919,967

(22) PCT Filed: Mar. 12, 2009

(86) PCT No.: PCT/JP2009/001120
§ 371 (c)(1),
(2), (4) Date: Dec. 7, 2010

(87) PCT Pub. No.: WO2009/119029
PCT Pub. Date: Oct. 1, 2009

(65) Prior Publication Data
US 2011/0126284 A1  May 26, 2011

(30) Foreign Application Priority Data
Mar. 28, 2008 (JP) ................................. 2008-087299

(51) Int. Cl.
*G06F 21/00* (2006.01)
(52) U.S. Cl.
USPC .................. 726/30; 726/31; 726/22

(58) Field of Classification Search
USPC .............................................. 726/30, 31, 22
See application file for complete search history.

(56) References Cited

U.S. PATENT DOCUMENTS
6,705,516 B1 * 3/2004 Kubota .......................... 235/375
(Continued)

FOREIGN PATENT DOCUMENTS
| EP | 1 780 686 | 5/2007 |
| EP | 2 026 238 | 2/2009 |

(Continued)

OTHER PUBLICATIONS

International Search Report issued Apr. 21, 2009 in International (PCT) Application No. PCT/JP2009/001120.

*Primary Examiner* — Jeffrey Pwu
*Assistant Examiner* — William Corum, Jr.
(74) *Attorney, Agent, or Firm* — Wenderoth, Lind & Ponack, L.L.P.

(57) ABSTRACT

A content playback device of the present invention includes a playback unit 200 operable to play back a content; a normal storage unit 250 that is not tamper-resistant; a secure storage unit 350 that is tamper-resistant; a first control sub-unit 230 that writes playback records indicating elapsed playback time of the content into the normal storage unit one by one at regular time intervals; and a second control sub-unit 330 that (i) writes monitoring records with respect to the playback records into the secure storage unit 350 one by one at irregular time intervals and (ii) determines that the playback records stored in the normal storage unit 250 have not been tampered with if a prescribed relation is satisfied between a specific time point obtained according to a latest one of the monitoring records and one of the playback records corresponding to the specific time point.

23 Claims, 16 Drawing Sheets

U.S. PATENT DOCUMENTS

| | | | |
|---|---|---|---|
| 7,747,532 B2 * | 6/2010 | Wakimoto | 705/59 |
| 2003/0123853 A1 * | 7/2003 | Iwahara et al. | 386/69 |
| 2004/0236788 A1 * | 11/2004 | Sato et al. | 707/104.1 |
| 2006/0287956 A1 | 12/2006 | Higashi et al. | |
| 2007/0214405 A1 * | 9/2007 | Chang et al. | 715/500.1 |
| 2009/0151000 A1 | 6/2009 | Okamoto et al. | |
| 2009/0320142 A1 * | 12/2009 | Takahashi et al. | 726/28 |

FOREIGN PATENT DOCUMENTS

| | | |
|---|---|---|
| JP | 2005-160032 | 6/2005 |
| JP | 2007-18177 | 1/2007 |
| WO | 2006/019158 | 2/2006 |
| WO | 2007/007764 | 1/2007 |
| WO | 2007/136006 | 11/2007 |

* cited by examiner

FIG. 2

Playback history

| Content ID | Playback record |
|---|---|
| 001 | 00 : 00. 00 |
|  | 00 : 01. 00 |
|  | 00 : 02. 00 |
|  | 00 : 03. 00 |
|  | 00 : 04. 00 |
|  | 00 : 05. 00 |
|  | 00 : 06. 00 |

FIG. 3

Content management table

| Content ID | File name |
|---|---|
| 001 | ¥MOVIE¥movie001.mpg |
| 002 | ¥MOVIE¥movie002.mpg |
| 003 | ¥AUDIO¥music001.aac |
| 004 | ¥AUDIO¥music002.aac |

FIG. 4

Right management table

| Content ID | Content key | Right type | Time indicated by playback right (h:m:s) | Accumulated playback time (h:m:s) | Playback expiration deadline (y:m:d) | Callback processing |
|---|---|---|---|---|---|---|
| 001 | Key 001 | Limitation on accumulated playback time type 1 | 02:00:00 | 00:00:30 | | Right consumption |
| 002 | Key 002 | Limitation on accumulated playback time type 2 | 01:30:00 | 00:30:15 | | Right consumption |
| 003 | Key 003 | Limitation on expiration deadline | — | — | 08/12/31 | Right consumption |
| 004 | Key 004 | Limitation on accumulated playback time 1 | 00:30:00 | 00:20:10 | | Advertisement display |

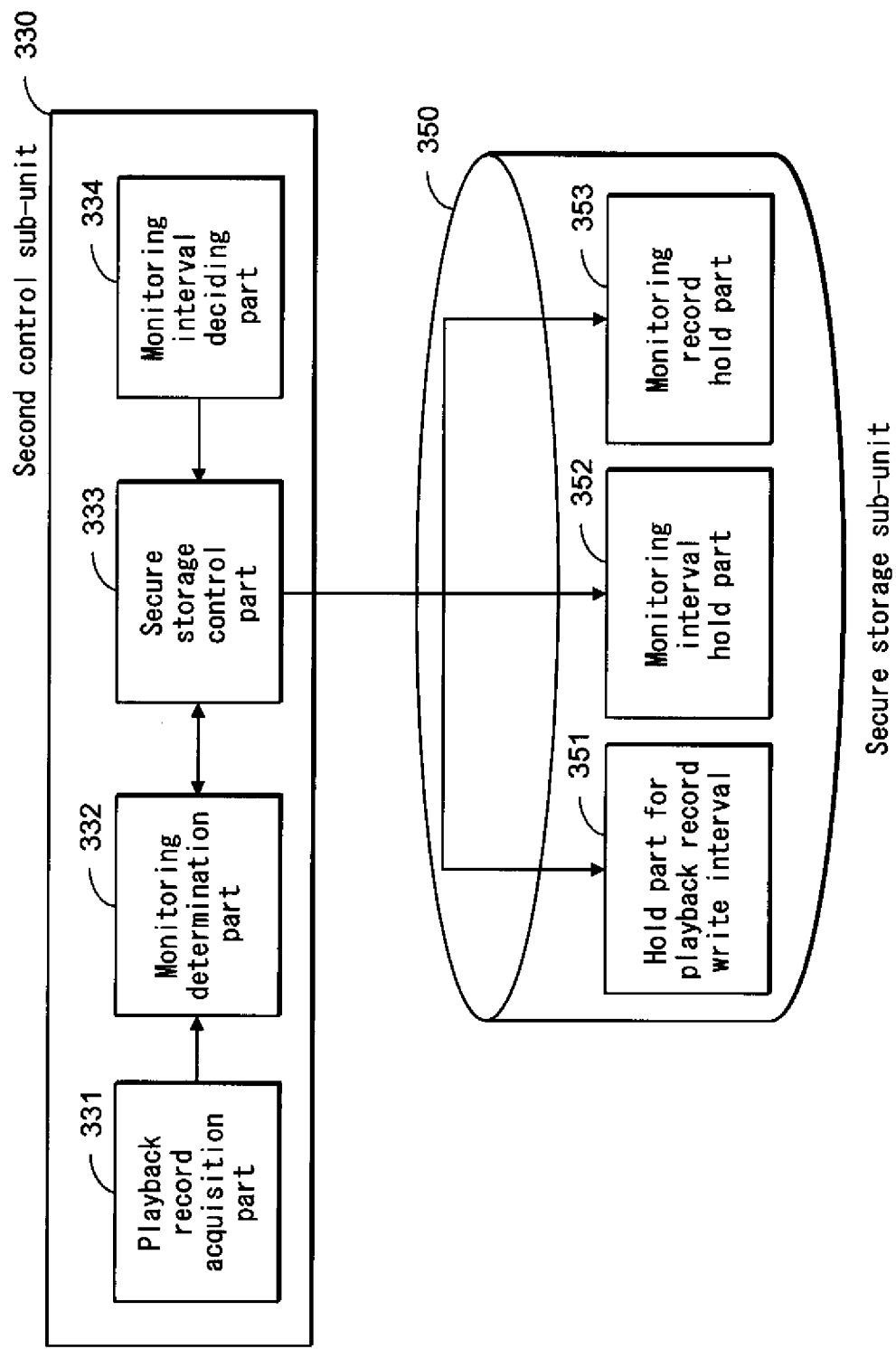

FIG. 6

| Content ID | Monitoring interval |
|---|---|
| 001 | 00 : 03.00 |
| 002 | 00 : 05.00 |
| 003 | 00 : 07.00 |

FIG. 15A

| Content ID | Playback record | Playback processing type |
|---|---|---|
| 001 | 00:00.00 | Play |
| | 00:01.00 | Play |
| | 00:02.00 | Play |
| | 00:03.00 | Play |
| | 00:04.00 | Seek |
| | 00:05.00 | Seek |
| | 00:06.00 | Play |

Limitation on accumulated playback time type 1

FIG. 15B

| Content ID | Playback record | Playback processing type |
|---|---|---|
| 002 | 00:00.00 | Play |
| | 00:01.00 | Play |
| | 00:02.00 | Play |
| | 00:03.00 | Seek |
| | 00:04.00 | Seek |
| | 00:05.00 | Seek |
| | 00:06.00 | Play |

Limitation on accumulated playback time type 2

FIG. 16A

Limitation on accumulated playback time type 1

| Content ID | Playback record | Playback processing type |
|---|---|---|
| 001 | 00:00.00 | Play |
| | 00:04.00 | Seek |
| | 00:06.00 | Play |

FIG. 16B

Limitation on accumulated playback time type 2

| Content ID | Playback record | Playback processing type |
|---|---|---|
| 002 | 00:00.00 | Play |
| | 00:03.00 | Seek |
| | 00:06.00 | Play |

CONTENT REPRODUCTION DEVICE, CONTENT REPRODUCTION DEVICE CONTROL METHOD, CONTENT REPRODUCTION PROGRAM, RECORDING MEDIUM, AND INTEGRATED CIRCUIT

TECHNICAL FIELD

The present invention relates to techniques for updating right information of digital contents whose playback rights are restricted, and for preventing the right information from tampered with and analyzed.

BACKGROUND ART

The DRM (Digital Right Management) systems that manage copying and playback of digital video and audio contents for the copyright protection by imposing limitations on the copying and playback are becoming increasing popular.

Some standards have been established for the DRM system. The standards include OMA DRM R2 for mobile phones and Marlin for digital appliances. In the DRM standards, contents are associated with right information that imposes various limitations on the playback rights, such as the maximum playback time for which the contents can be played, the maximum playback counts for which the contents can be played, and the expiration deadline of the playback. DRM-compliant devices are required to adhere to the right information in order to perform processing for playing back the contents and consuming the right information.

The DRM standards must be implemented to guarantee the prevention of unauthorized playback, which infringes the prescribed playback right by tampering with the right information or bypassing the consumption processing. For example, it is necessary to prevent a malicious user from circumventing the consumption by cutting off a power supply to a playback device deliberately in advance of the consumption processing.

Patent Literature 1 discloses a method for monitoring whether unauthorized processing has occurred during the playback of contents by monitoring whether proper operations are performed in specific command processing at regular time intervals.

Among the DRM standards, Marlin is characterized by its callback processing for executing prescribed operations if any one of prescribed conditions is satisfied. Specifically, the callback processing is for performing operations, such as playback interruption, advertisement display, and charging, when the accumulated playback time is greater than the prescribed maximum playback time. Non-Patent Literature 1 discloses several types of the callback processing. In the Marlin DRM system, various types of the right information using the callback processing are specified, whereby a wider variety of the playing back processing is supported compared with conventional DRM systems.

CITATION LIST

Patent Literature

[Patent Literature 1]
Japanese Patent Application Publication No. 2007-18177

Non-Patent Literature

[Non-Patent Literature 1]
Octopus Controls version 1.0.1 Final, Sep. 6, 2006. (www-.marlin-community.com)

SUMMARY OF INVENTION

Technical Problem

However, in order to execute the callback processing without any delay from the timing at which the callback processing should be performed, it is necessary to write playback records at a high frequency, such as every second. This involves rewriting a memory storing the playback records at the high frequency. As a result, the life of the memory is significantly shortened.

To address this problem, in memories like a flash memory that can be rewritten only for a limited number of times, it is common that data to be written at a high frequency is dispersed in some areas in the memory. However, such a solution requires a large capacity memory.

On the other hand, the memory storing the playback records to be non-volatile in order to cope with an illicit power-off operation by the malicious user by maintaining the playback records written so far. Further, in order to prevent the playback records from being tampered with during the power-off, the playback records need to be stored in a secure memory protected by a tamper-resistant technology or the like.

Thus, in order to store the playback records while meeting a demand for the high frequency overwriting and the prevention of tampering, a non-volatile secure memory having a large capacity is necessary.

However, tamper-resistant secure memories are more expensive than conventional flash memories, all the more so the larger capacities they have.

In view of the above problems, the present invention aims to provide a content playback device, a method for controlling the content playback device, a content playback program, a recording medium, and an integrated circuit, all of which are capable of writing playback records at a high frequency, while preventing the playback records from being tampered with, without using the non-volatile secure memory having a large capacity.

Solution to Problem

In order to solve the above problems, one aspect of the present invention is a content playback device, comprising a playback unit operable to play back a content; a normal storage unit that is not tamper-resistant; a secure storage unit that is tamper-resistant; a first control unit operable to write playback records into the normal storage unit one by one at regular time intervals, each playback record indicating elapsed playback time of the content; and a second control unit operable to (i) write monitoring records with respect to the playback records into the secure storage unit one by one at irregular time intervals and (ii) determine that the playback records have not been tampered with if a prescribed relation is satisfied between a specific time point obtained according to a latest one of the monitoring records and one of the playback records corresponding to the specific time point.

Advantageous Effects of Invention

According to the above configuration, the playback records each indicating the elapsed playback time of the content are written into the normal storage unit one by one at the regular time intervals. On the other hand, the monitoring records with respect to the elapsed playback time are written into the secure storage unit one by one at the irregular time intervals. It should be noted that the playback records indicating the elapsed playback time of the content are stored not in the secure storage unit but in the normal storage unit at the regular time intervals. This reduces the frequency of update of the information stored in the secure storage unit compared with the case in which the playback time of the content is monitored only based on the information stored in the secure storage unit.

Further, it is determined that the playback records stored in the normal storage unit have not been tampered with if a prescribed relation is satisfied between the specific time point obtained according to the latest one of the monitoring records and one of the playback records corresponding to the specific time point. In other words, the validity of the elapsed playback time of the content indicated by the playback records is determined with use of the playback time points that are obtained at the irregular time intervals according to the monitoring records stored in the secure storage unit. Thus, even when the playback records are stored in the normal storage unit that is insecure, the validity of the playback records is determined at the irregular time intervals without notice by using the monitoring records stored in the secure storage unit that cannot be altered from the outside. Note that since the secure storage unit is not accessible from the outside of the content playback device, an unauthorized analyst finds it difficult to see the monitoring records.

With the above configuration, tampering of the playback records is made difficult, while the update frequency of the secure storage unit is reduced so as to lengthen the life of the secure storage unit.

BRIEF DESCRIPTION OF DRAWINGS

FIG. 2 shows a playback history according to the first embodiment of the present invention.

FIG. 3 shows a content management table according to the first embodiment of the present invention.

FIG. 4 shows a right management table according to the first embodiment of the present invention.

FIG. 5 shows internal structures of a second control sub-unit 330 and a secure storage unit 350 of the content playback device 100 according to the first embodiment of the present invention.

FIG. 6 shows monitoring intervals determined by a monitoring interval determination unit 334 of the content playback device 100.

FIG. 15A and FIG. 15B each show playback histories associated with playback processing commands according to the third embodiment of the present invention.

FIG. 16A and FIG. 16B show command holding tables according to the third embodiment of the present invention.

Figure 1:
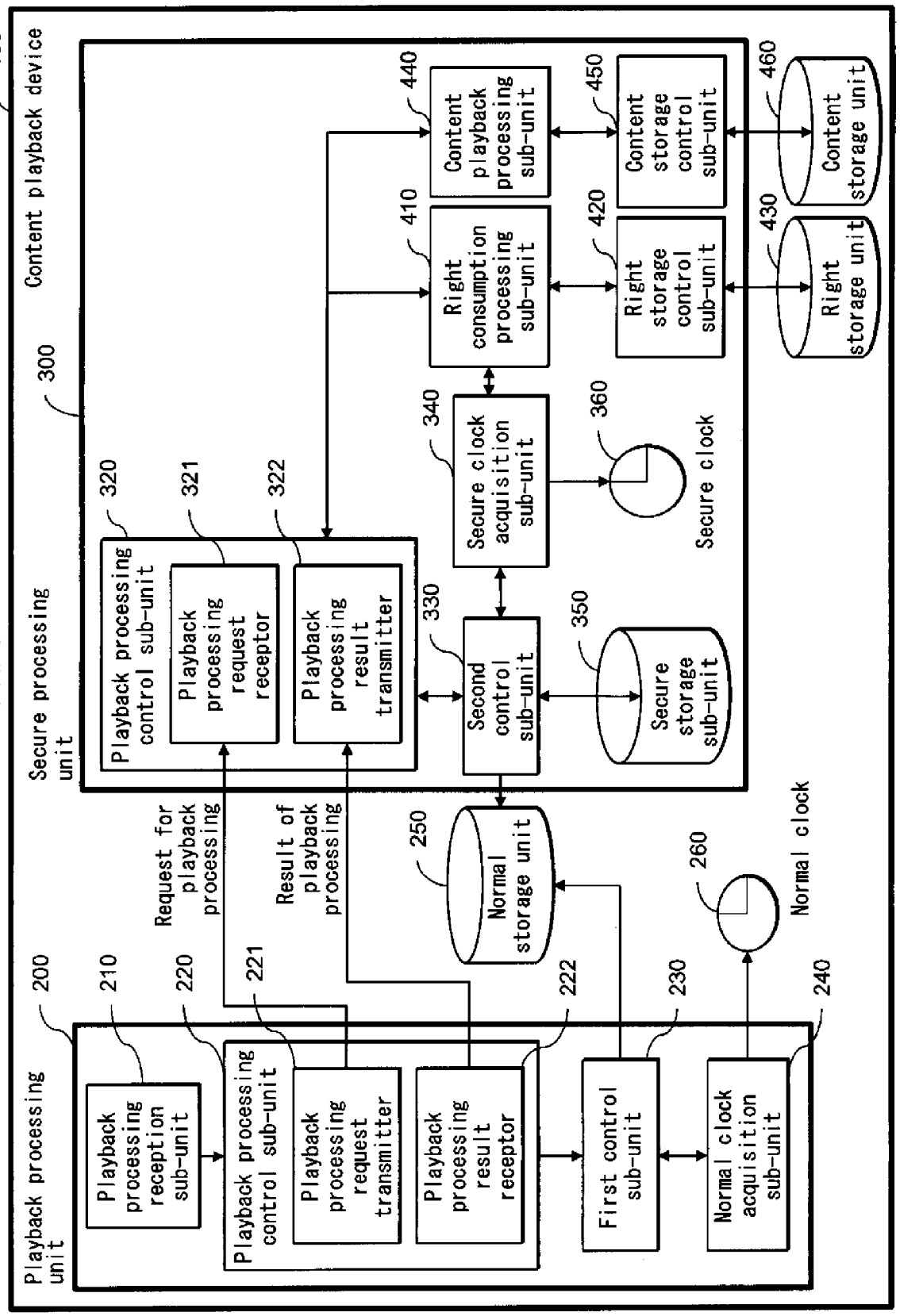
FIG. 1 shows a structure of a content playback device 100 according to a first embodiment of the present invention.

EXPLANATION OF REFERENCE 100 content playback device
200 playback processing unit
210 playback processing reception sub-unit
220 playback processing control sub-unit
221 playback processing request transmitter
222 playback processing result receptor
230 first control sub-unit
240 normal clock acquisition sub-unit
250 normal storage unit
260 normal clock
300 secure processing unit
320 secure processing control sub-unit
321 playback processing request receptor
322 playback processing result transmitter
330 second control sub-unit
331 playback record acquisition part
332 monitoring determination part
333 secure storage control part
334 monitoring interval deciding part
350 secure storage sub-unit
351 hold part for playback record write interval
352 monitoring interval hold part
353 monitoring record hold part
354 command record hold part
360 secure clock
410 right consumption processing sub-unit
420 right storage control sub-unit
430 right storage unit
440 content playback processing sub-unit
450 content storage control sub-unit
460 content storage unit

DESCRIPTION OF EMBODIMENTS

A first aspect of the present invention provides a content playback device, comprising: a playback unit operable to play back a content; a normal storage unit that is not tamper-resistant; a secure storage unit that is tamper-resistant; a first control unit operable to write playback records into the normal storage unit one by one at regular time intervals, each playback record indicating elapsed playback time of the content; and a second control unit operable to (i) write monitoring records with respect to the playback records into the secure storage unit one by one at irregular time intervals and (ii) determine that the playback records have not been tampered with if a prescribed relation is satisfied between a specific time point obtained according to a latest one of the monitoring records and one of the playback records corresponding to the specific time point.

The elapsed playback time mentioned above refers to playback time elapsed from a specific time point, such as the playback start point from the very beginning of the content.

According to the above aspect, the playback records each indicating the elapsed playback time of the content are written into the normal storage unit one by one at the regular time intervals. On the other hand, the monitoring records with respect to the elapsed playback time are written into the secure storage unit one by one at the irregular time intervals. It should be noted that the playback records indicating the elapsed playback time of the content are stored not in the secure storage unit but in the normal storage unit at the regular time intervals. This reduces the frequency of update of the information stored in the secure storage unit compared with the case in which the playback time of the content is monitored only based on the information stored in the secure storage unit.

Further, it is determined that the playback records stored in the normal storage unit have not been tampered with if a prescribed relation is satisfied between the specific time point obtained according to the latest one of the monitoring records and one of the playback records corresponding to the specific time point. In other words, the validity of the elapsed playback time of the content indicated by the playback records is determined with use of the playback time points that are obtained at the irregular time intervals according to the monitoring records stored in the secure storage unit. Thus, even when the playback records are stored in the normal storage unit that is insecure, the validity of the playback records is determined at the irregular time intervals without notice by using the monitoring records stored in the secure storage unit that cannot be altered from the outside. Note that since the secure storage unit is not accessible from the outside of the content playback device, an unauthorized analyst finds it difficult to see the monitoring records.

With the above configuration, the update frequency of the secure storage unit is reduced and the life of the secure storage unit is lengthened, while the tampering is made difficult.

In the content playback device according to a second aspect of the present invention, the prescribed relation is satisfied when the specific time point matches the elapsed playback time indicated by the corresponding playback record.

According to the above aspect, whether the playback records stored in the normal storage unit have been tampered with is strictly determined.

In the content playback device according to a third aspect of the present invention, the prescribed relation is satisfied when the specific time point is less than the elapsed playback time indicated by the corresponding playback record.

According to the above aspect, whether the playback records stored in the normal storage unit have been tampered with is determined within a certain degree of tolerance.

In the content playback device according to a fourth aspect of the present invention, any of the irregular time intervals is greater than any of the regular time intervals.

According to the above aspect, any of the irregular time intervals is greater than any of the regular time intervals. Accordingly, even if the regular time intervals indicated by the playback records stored in the normal storage unit are specified, this does not help specify the irregular time intervals indicated by the monitoring record information stored in the secure storage unit. As a result, the tamper resistance property of the playback records is improved against the tampering involving modifications based on monitoring timings (for example, by modifying the playback records and hide the modification just in time for the monitoring timings).

Moreover, the update frequency of the monitoring records stored in the secure storage unit is less compared with the case in which the playback records are stored in the secure storage unit.

In the content playback device according to a fifth aspect of the present invention, the irregular time intervals are each determined based on random numbers.

Making the irregular time intervals random according to the above aspect prevents the irregular time intervals from being specified, thereby improving the tamper resistance of the playback records against the tampering involving the modifications based on the monitoring timings.

In the content playback device according to a sixth aspect of the present invention, the irregular time intervals vary according to a predetermined rule, and the number of the monitoring records written into the secure storage unit by the second control unit at the irregular time intervals during a certain time period is less than the playback records written into the normal storage unit by the first control unit at the regular time intervals during the time period.

The time intervals varying according to the predetermined rule in the above aspect are intervals that increase, decrease, or change in any other way at regular intervals.

According to the above aspect, since the irregular time intervals indicated by the monitoring record information stored in the secure storage unit are not specified, the tamper resistance of the playback records is improved against the tampering involving the modifications based on the monitoring timings.

In this aspect, by making the number of the monitoring records written into the secure storage unit by the second control unit at the irregular time intervals during a certain time period less than the playback records written into the normal storage unit by the first control unit at the regular time intervals during the time period, the update frequency of the monitoring records stored in the secure storage unit is less compared with the case in which the playback records are stored in the secure storage unit.

In the content playback device according to a seventh aspect of the present invention, the second control unit is tamper-resistant, the monitoring records written into the secure storage unit are each counter information indicating an order in which the monitoring records have been written, and the second control unit obtains the specific time point based on the irregular time intervals and the counter information.

According to the above aspect, even when the secure storage unit holds counter values in stead of monitoring time records as the monitoring records, the second control unit properly determines about the occurrence of the tampering.

In the content playback device according to an eighth aspect of the present invention, the secure storage unit stores a variety of irregular time intervals in advance, and the second control unit selects one of the irregular time intervals each time the second control unit writes a monitoring record into the secure storage unit.

Selecting one of the predetermined irregular time intervals according to the above aspect prevents the irregular time intervals from speculated by the unauthorized analyst.

In the content playback device according to a ninth aspect of the present invention, the second control unit determines each of the irregular time intervals prior to playback of the content.

According to the above aspect, even if the irregular time intervals with respect to one content are specified by the unauthorized analyst, this does not help the analyst to specify the irregular time intervals with respect to other contents. As a result, the tamper resistance property of the playback records is improved against the tampering involving the modifications based on the monitoring timings.

In the content playback device according to a tenth aspect of the present invention, the second control unit determines each of the irregular time intervals during playback of the content.

According to the above aspect, even if the irregular time intervals with respect to one content are specified by the unauthorized analyst at a specific timing during the playback, once the irregular time intervals are modified during the playback, this does not help the analyst to specify the modified intervals. As a result, the tamper resistance property of the playback records is improved against the tampering involving the modifications based on the monitoring timings.

In the content playback device according to an eleventh aspect of the present invention, the second control unit continuously determines the relation between the specific time point and the corresponding playback record and varies the irregular time intervals on each determination.

According to the above aspect, even if the irregular time intervals with respect to one content are specified by the unauthorized analyst at a specific timing during the playback, once the irregular time intervals are modified, this does not help the analyst to specify the modified intervals. As a result, the tamper resistance property of the playback records is improved against the tampering involving the modifications based on the monitoring timings.

In the content playback device according to a twelfth aspect of the present invention, a right consumption processing unit operable to perform predetermined processing when accumulated playback time of the content is greater than a predetermined time, wherein when the prescribed relation is satisfied, the right consumption processing unit determines whether the accumulated playback time is greater than the predetermined time using the playback records.

According to the above aspect, the detection for the tampering of the playback records is also applicable in the case in which the right consumption processing unit is provided that performs the predetermined processing when the accumulated playback time is greater than the predetermined time.

In this case, the right consumption processing unit determines whether the playback records stored in the normal storage unit have been tampered with before determining whether the accumulated playback time is greater than the predetermined time.

Since the update frequency with respect to the monitoring records is less than the update frequency with respect to the playback records, if the playback records have not been tampered with, the determination about whether the accumulated playback time is greater than the predetermined time is made with use of the elapsed playback time indicated by the playback records.

As a result, the determination about whether the playback time is greater than the predetermined time is strictly performed.

In the content playback device according to a thirteenth aspect of the present invention, when the prescribed relation is not satisfied, the right consumption processing unit determines whether the accumulated playback time is greater than the predetermined time according to the specific time point.

According to the above aspect, even when the playback records have been tampered with, the determination about whether the accumulated playback time is greater than the predetermined time is made according to the playback time point indicated by the latest one of the monitoring records stored in the secure storage unit that is more reliable.

The predetermined processing performed by the right consumption unit is the callback processing, for example. Even when the callback processing fails to be performed successfully due to the unexpected power-off illicitly performed by the malicious user, the callback processing is eventually performed prior to the playback of the content according to the playback time elapsed before the power-off.

Further, since the verification of the playback records is performed prior to the callback processing, it is possible to detect whether the playback records have been tampered with during the power-off. Then, if it is detected that the playback records have been tampered with, the callback processing is performed using the monitoring records according to one of the monitoring records closest to the actual playback time.

As a result, the copyright protection of the content is performed as strictly as possible.

In the content playback device according to a fourteenth aspect of the present invention, the monitoring records in the secure storage unit and the playback records in the normal storage unit are deleted once the right consumption processing unit completes the predetermined processing.

Deleting the unnecessary monitoring and playback records after the completion of the right consumption processing according to the above aspect increases available space in the memories.

In the content playback device according to a fifteenth aspect of the present invention, the second control unit (i) continuously determines the relation between the specific time point and the corresponding playback record, (ii) deletes, on each determination, all specific time points obtained according to the monitoring records in the secure storage unit but the specific time point used in a previous determination, and (iii) deletes all the playback records in the normal storage unit but the playback record used in the previous determination.

Deleting the used monitoring and playback records unnecessary for the verification of the playback records according to the above aspect increases available space in the memories.

In the content playback device according to according to a sixteenth aspect of the present invention, the first control unit writes a playback record together with a type of playback processing performed at the corresponding elapsed playback time into the normal storage unit at the regular time intervals, and the second control unit (i) selects some of the playback records corresponding to specific types of the playback processing and (ii) determines the relation between the specific time point and one of the selected playback records corresponding to the specific time point.

According to the above aspect, the playback right is not consumed during, for example, the seek processing (during when a user selects a desired scene).

In the content playback device according to a seventeenth aspect of the present invention, a normal clock operable to measure elapsed time, wherein the second control unit determines the relation with reference to the normal clock.

According to the above aspect, the verification of the playback records is performed based on a simple calculation using the normal clock.

In the content playback device according to an eighteenth aspect of the present invention, a normal clock operable to measure elapsed time, wherein the second control unit determines time intervals at which the normal clock measures the elapsed time and notifies the determined time intervals to the first control unit, the first control unit writes playback records into the normal storage unit at the regular time intervals as notified by the second control unit.

According to the above aspect, the time regular intervals at which the playback records are measured are determined and held by the second control unit. Since the progress of the playback is not checked between one measurement and a next, it can be said that the regular time intervals at which the playback records are measured are temporal tolerances in the verification of the playback records. By causing the second control unit to determine and hold the regular time intervals, the tamper resistance property of the playback records is improved.

A nineteenth aspect of the present invention provides a content playback device, comprising: a playback unit operable to play back a content; a normal storage unit that is not tamper-resistant; a secure storage unit that is tamper-resistant;

a first control unit operable to write playback records into the normal storage unit one by one at first time intervals, each playback record indicating elapsed playback time of the content; and a second control unit operable to (i) write monitoring records with respect to the playback records into the secure storage unit one by one at second time intervals greater than the first time intervals and (ii) determine that the playback records have not been tampered with if a prescribed relation is satisfied between a specific time point obtained according to a latest one of the monitoring records and one of the playback records corresponding to the specific time point.

According to the aspect, the playback records are written not into the secure storage unit but into the normal storage unit at the first time intervals less than the second time intervals. This reduces the frequency of update of the information stored in the secure storage unit compared with the case in which the playback time of the content is monitored only based on the information stored in the secure storage unit.

Further, it is determined that the playback records stored in the normal storage unit have not been tampered with if a prescribed relation is satisfied between the specific time point obtained according to the latest one of the monitoring records and one of the playback records corresponding to the specific time point. In other words, the validity of the elapsed playback time of the content indicated by the playback records is determined with use of the playback time points that are obtained at the irregular time intervals according to the monitoring records stored in the secure storage unit. Thus, even when the playback records are stored in the normal storage unit that is insecure, the validity of the playback records is determined at the irregular time intervals without notice by using the monitoring records stored in the secure storage unit that cannot be altered from the outside. Note that since the secure storage unit is not accessible from the outside of the content playback device, an unauthorized analyst finds it difficult to see the monitoring records.

With the above configuration, the update frequency of the secure storage unit is reduced and the life of the secure storage unit is lengthened, while the tampering is made difficult.

First Embodiment

The following describes the content playback device according to a first embodiment of the present invention. In the first embodiment, a limitation is imposed on the maximum playback time of a content. The content playback device plays back the content under the imposed limitation.

FIG. 1 shows a structure of the content playback device 100 according to the present embodiment.

The content playback device 100 acquires an encrypted content and right information containing a content key and a usage condition of the content through a content distribution service using a network, such as the Internet. The content playback device 100 then decrypts the acquired encrypted content with use of the acquired content key in accordance with the acquired right information to play back the content.

The content playback device 100 is in particular an electric appliance, such as a TV, HDD recorder, BD/DVD recorder, set top box, mobile phone, and PDA provided with the network function.

The above-mentioned usage condition of the content is a condition for imposing a certain limitation on the playback right, such as the maximum playback time, maximum playback counts, and the expiration deadline of the playback. In this embodiment, the description is given of a case in which the content is associated with the playback right that extinguishes when the accumulated playback time reaches a predetermined maximum time.

As shown in FIG. 1, the content playback device 100 includes a playback processing unit 200 and a secure processing unit 300. The content playback device 100 further includes a normal storage unit 250 and a normal clock 260. The secure processing unit 300 further includes a right storage control sub-unit 420 and a content storage control sub-unit 450.

The playback processing unit 200 is an application for the playback of the content. Upon reception of a playback processing command from the user, the playback processing unit 200 requests the secure processing unit 300 to process the playback processing command. The playback processing unit 200 then receives a result of the processing from the secure processing unit 300.

The secure processing unit 300 processes the playback processing command as requested from the playback processing unit 200, and further performs processing with respect to information that is related to the content playback processing and requires integrity and confidentiality. Some examples of the processing are content decryption processing using the content key, consumption processing for consuming the playback right in accordance with the usage condition, and monitoring processing for monitoring whether unauthorized playback has occurred due to the tampering or analysis of the playback right.

The secure processing unit 300 may be implemented in software or hardware. In either case, the secure processing unit 300 is protected using a tamper-resistant technology.

A description is given below of an internal structure of each of the playback processing unit 200 and the secure processing unit 300 included in the content playback device 100.

Playback Processing Unit 200

A description is given of the internal structure of the playback processing unit 200.

The playback processing unit 200 includes a playback processing reception sub-unit 210, a playback processing control sub-unit 220, a first control sub-unit 230, and a normal clock acquisition sub-unit 240.

The playback processing reception sub-unit 210 receives the playback processing command from the user. The playback processing command in this embodiment is an instruction to perform one of playback start, stop, pause, seek processing (e.g., playback forward/rewind), and skip processing for skipping to a next content following the content being played.

The playback processing control sub-unit 220 also receives the playback processing command that has been received from the user by the playback processing reception sub-unit 210. The playback processing control sub-unit 220 then requests the secure processing control sub-unit 320 to perform processing in accordance with the received playback processing command. Further, the playback processing control sub-unit 220 receives the result of the processing from the secure processing control sub-unit 320.

The first control sub-unit 230 writes playback records into the normal storage unit 250 at regular time intervals during the playback of the content. A playback history lists the playback records indicating the time elapsed during the playback at the regular time intervals.

Specifically, a table of FIG. 2 shows one example of the playback history. In this example, it is shown that, with respect to the content identified by the content ID "001", the playback records have been written into the playback history one by one every second and that the content has been played back for six seconds.

Precise playback history of the content depends on precise writing of the playback records performed by the first control sub-unit 230. Accordingly, in order to realize the playback right consumption processing on the second time scale and the callback processing without a delay on the second time scale, the first control sub-unit 230 needs to write the playback records at the regular time intervals on the second time scale.

In order to write the playback records into the normal storage unit 250 at the regular intervals, the first control sub-unit 230 acquires the value of the normal clock 260 through the normal clock acquisition sub-unit 240. The first control sub-unit 230 also holds the playback record write interval for writing the playback records at the regular time intervals. The first control sub-unit 230 utilizes the value of the normal clock 260 and the playback record write interval to determine whether it is an appropriate timing to write a playback record. Meanwhile, the processing performed at the regular intervals is not limited to the above implementation method, and interruption processing using a watch dog timer and polling processing may also be used.

In response to the instruction from the first control sub-unit 230, the normal clock acquisition sub-unit 240 acquires a time from the normal clock 260.

Secure Processing Unit 300

A description is given of the internal structure of the secure processing unit 300.

The secure processing unit 300 includes the secure processing control sub-unit 320, a second control sub-unit 330, a secure storage sub-unit 350, a secure clock acquisition sub-unit 340, a secure clock 360, a right consumption processing sub-unit 410, and a content playback processing sub-unit 440.

The secure processing control sub-unit 320 receives the playback processing command from the playback processing control sub-unit 220 and requests an appropriate unit to perform processing indicated by the received processing command. The secure processing control sub-unit 320 also returns a result of the processing performed by the corresponding sub-unit to the playback processing control sub-unit 220.

The second control sub-unit 330 monitors whether or not the playback records written by the first control sub-unit 230 have been tampered with at predetermined time intervals. The monitoring is done by reading the playback records stored in the normal storage unit 250 at the predetermined time intervals and determining whether the playback records have been written at the regular time intervals.

The timings of the monitoring are determined and held by the secure processing unit 300 and is unknowable to the playback processing unit 200. Further, since the secure processing unit 300 is tamper-resistant, unauthorized analysts find it difficult to specify the monitoring timings even if they try to analyze the internal structure of the content playback device 100. It can be said that the tampering involving modification of the playback history based on the monitoring timings (for example, by modifying the playback history and hiding the modification just in time for the monitoring operations) is not performed.

If impropriety is detected in the playback history, the second control sub-unit 330 stops the playback, for example. A detailed description of the second control sub-unit 330 is given later.

The content playback processing sub-unit 440 reads an encrypted content whose playback is requested through the content storage control sub-unit 450. Subsequently, the content playback processing sub-unit 440 decrypts the encrypted content using the content key acquired by right consumption processing sub-unit 410. The content playback processing sub-unit 440 plays back the content by decoding the content generated through the decryption.

The right consumption processing sub-unit 410 performs the playback right consumption processing for the content whose playback is requested, by reducing the playback right of the content for the amount of the playback.

Specifically, the right consumption processing sub-unit 410 reads the right information associated with the content from the right storage unit 430 through the right storage control sub-unit 420 to check the usage condition. If the checked usage condition is specified by the expiration deadline, such as a date and time, the right consumption processing sub-unit 410 acquires the value of the secure clock 360 through the secure clock acquisition sub-unit 340. The right consumption processing sub-unit 410 then checks whether the playback right exists with use of the acquired value. If it is checked by the right consumption processing sub-unit 410 that the playback right exists, the right consumption processing sub-unit 410 acquires the content key from the right information. Further, the right consumption processing sub-unit 410 performs other processing, such as adding additional information indicating the right consumed and the right newly purchased by the user to a right management table shown in FIG. 4.

Note that in the present embodiment the description is given of the case in which the right consumption processing sub-unit 410 performs the consumption processing by reducing the playback time actually elapsed during the playback from the maximum playback time of the content. However, the present embodiment is not limited to this, and the right consumption processing sub-unit 410 may also perform the conventional callback processing (i.e. playback interruption, advertisement display, and charging).

The secure storage unit 350 is a non-volatile secure memory. That is to say, the secure storage unit 350 is accessible only by the other components in the secure processing unit 300 through a secure storage control part 333. The secure storage unit 350 is in particular embodied by a non-volatile memory represented by a flash memory. The non-volatile memory is not limited to the flash memory, and may be a FeRAM or the like.

The secure storage unit 350 stores therein information to be protected, such as information indicating the monitoring intervals at which the second control sub-unit 330 monitors whether the playback records have not been tampered with.

The secure clock 360 is a clock used for measuring the monitoring timings for the second control sub-unit 330 to check whether the playback records have not been tampered with. The secure clock 360 is implemented using the tamper-resistant technology so as to prevent the tampering with respect to the secure clock 360.

The secure clock acquisition sub-unit 340 acquires a time from the secure clock 360 in response to an instruction from the second control sub-unit 330.

The right storage control unit 420 controls the access to the right storage unit 430 in response to an instruction from the content playback processing sub-unit 410.

The content storage control sub-unit 450 controls the access to the content storage unit 460 in response to an instruction from the content playback processing sub-unit 440.

Other Components

The content playback device 100 further includes a normal storage unit 250, a normal clock 260, a content storage unit 460, and a right storage unit 430 in order to hold the playback history, the content, and the right information of the content.

The normal storage unit 250 is a memory storing the playback records. The playback records stored are written into the normal storage unit 250 by the first control sub-unit 230 at the regular time intervals. Note that even when the consumption processing for the playback right fails to be performed by the power-off prior to the execution of the consumption processing based on the stored playback records, for example, the failed consumption needs to be performed before the content is played back again. For this reason, the normal storage unit 250 is embodied by a non-volatile memory, such as the flash memory and the FeRAM.

The normal clock 260 is a clock used for measuring the write timing of the playback records.

The content storage unit 460 holds a plurality of contents and a content management table for managing the contents. The content management table includes identifiers identifying the contents and the names of the files containing the contents, in one-to-one correspondence.

FIG. 3 shows one example of the content management table. In FIG. 3, for example, the content identified by the content ID "001" is a video content and stored in the file "¥MOVIE¥movie001.mpg". The content identified by the content ID "003" is an audio content and stored in the file "¥AUDIO¥music001.aac". The content management table held in the content storage unit 460 is read and written through the content storage control sub-unit 450.

The right storage unit 430 holds a right management table. The right management table indicates the contents, playback rights, callback processing executed when the playback rights are consumed, in correspondence with each other. A detailed description is given right below of the items included in the right management table. The right management table held in the right storage unit 430 is accessed through the right storage control unit 420. The right information associated with the content whose playback is requested is thus read and written through the right storage control unit 420.

Right Management Table

A description is given below of the right management table.

FIG. 4 shows one example of the right management table held by the right storage unit 430. The right management table includes respective columns for the content ID, content key for decrypting the encrypted content, playback right type for identifying the usage condition, playback right time specifying the maximum playback time, accumulated playback time indicating the accumulated amount of time elapsed during the playback, expiration deadline of the playback, and callback processing type to be executed when the limitation imposed by the usage condition is exceeded.

Meanwhile, the content key included in the right management table may be either the content key itself used for decrypting the encrypted content or the information for specifying the content key. In other words, the right management table may store the content key value as the content key, or alternatively, if the content key is managed under a different database, where the location to be referred to in the database. Further, the content key may be encrypted for the storage for the sake of the protection of the content key.

In FIG. 4, the accumulated playback time and expiration deadline are used as the examples of the right type.

In this example, it is assumed that there are two types of the accumulated playback time: the accumulated playback time type 1 and the accumulated playback time type 2. The accumulated playback time type 1 is designed to count the time spent for such seek processing as fast-forward, rewind, and skip in the accumulated playback time, in addition to the time spent for playback. On the other hand, the accumulated playback time type 2 is designed not to count the seek processing time in the accumulated playback time.

The expiration deadline is a right type whose playback right is limited to a certain period. For example, with respect to the content identified by the content ID "0003" in FIG. 4, it is shown that the expiration deadline of the playback is set "08/12/31". This means that the playback right of the content is valid until Dec. 31, 2008.

Note that the right types are not limited to the above and may be the masimum playback counts or other types associated with specific commands Specifically, it is also possible to use the right type designed to perform predetermined callback processing once the playback start command is executed, and the right type designed to perform predetermined callback processing once the playback stop command is executed.

Note that the present embodiment only deals with the content of the accumulated playback time type 1. The content of the accumulated playback time type 2 is explained in the later-described third embodiment. In addition, any callback processing executable by the secure processing unit 300 may be used.

Secure processing executed by the secure processing unit 300 is the following three procedures: update processing for updating the right information associated with the content; playback processing for decrypting the encrypted content and playing back the decrypted content in accordance with the playback request; and monitoring processing for monitoring whether the playback history has been tampered with.

In FIG. 4, the right consumption processing and advertisement display processing is used as the examples of the callback processing.

For example, it is shown that the content identified by the content ID "0001" corresponds to the right information that the content key is a "key 001", the right type is the "accumulated playback time type 1", the maximum playback right time is "02 h:00 m:00 s", the accumulated playback time is "00 h:00 m:30 s", and the right consumption processing is executed if the accumulated playback time reaches "02 h:00 m:00 s".

It is also shown that the content identified by the content ID "0004" corresponds to the right information that the content key is a "key 004", the right type is the "accumulated playback time type 1", the maximum playback right time is "00 h:30 m:00 s", the accumulated playback time is "00 h:20 m:10 s", and the right consumption processing is executed if the accumulated playback time reaches "00 h:30 m:00 s".

Second Control Sub-Unit 330 and Secure Storage Unit 350

A description is given of the second control sub-unit 330 and the secure storage unit 350.

FIG. 5 shows internal structures of the second control sub-unit 330 and the secure storage unit 350.

The second control sub-unit 330 checks whether the playback processing unit 200 is properly playing back the content, by reading the playback records written into the normal storage unit 250 by the first control sub-unit 230 and monitoring whether the playback records have been written by the first control sub-unit 230 at the predetermined time intervals.

As shown in FIG. 5, the second control sub-unit 330 includes a playback record acquisition part 331, a monitoring determination part 332, a secure storage control part 333, and a monitoring interval deciding part 334.

The playback record acquisition part 331 reads the playback records stored in the normal storage unit 250 at predetermined time intervals specified by the monitoring intervals.

The monitoring interval is determined by the monitoring interval deciding part 334 by means of a random number generator everytime the content is played back. The generated monitoring interval is written into the monitoring interval hold part 352 of the secure storage unit 350 through the secure storage control part 333. Thus, since the secure processing unit 300 performs all processes from the determination to the storage, the monitoring interval is unknowable to the playback processing unit 200.

In case the monitoring interval is known, attackers may modify the playback history based on the monitoring timings. Such attacks are prevented in the present embodiment by newly determining the monitoring interval on each playback of the content in the secure processing unit 300.

As a result, even if the monitoring interval is accidentally known during the playback of one content and the playback history has been tampered with based on the interval, the content is not attacked based on the same interval at another time when the content is played.

Meanwhile, the trigger of the monitoring processing according to the monitoring intervals is made by using the information obtained from the secure clock 360 by the playback record acquisition part 331 through the secure clock acquisition sub-unit 340. Unlike the normal clock 260, the secure clock 360 is a secure clock accessible only by the other components of the secure processing unit 300 through the secure clock acquisition sub-unit 340.

Meanwhile, the implementation method of the monitoring processing is not limited to the above, and interruption processing using a watch dog timer and polling processing may also be used. In any case, it is prerequisite that the monitoring processing is not tampered with and secretly executed without known by the playback processing unit 200.

Further, although in this embodiment the monitoring interval determination unit 334 determines a monitoring interval for each content based on a random number, a predetermined different monitoring interval may be used for each content as shown in FIG. 6. It is also possible to select one monitoring interval from a plurality of predetermined monitoring intervals, or set a calculation result obtained by choosing a plurality of monitoring intervals to be the monitoring interval.

The above methods help to limit test cases at the time of developing terminals. Moreover, the implementation of the monitoring interval determination unit 334 is made easier and the need for providing an additional random number generator is omitted, whereby the cost of the terminals are reduced.

The secure storage control part 333 performs read and write processing for reading the information stored in the secure storage unit 350 and writing additional information to the secure storage unit 350.

The information stored in the secure storage unit 350 is used so that, even if the power-off occurs before the right consumption processing for the content limited by the expiration deadline has been completed, the consumption is surely made prior to the next playback processing. For this purpose, the secure storage unit 350 must be the non-volatile memory, such as the flash memory. The non-volatile memory is not limited to the flash memory and may be the FeRAM. Further, in order to prevent the tampering after the power-off, the secure storage unit 350 must be a non-volatile secure memory accessible only by the other components of the secure processing unit 300 through a secure storage control part 333.

The monitoring determination part 332 verifies whether the proper playback record as expected is stored in the normal storage unit 250, using the playback record write interval held by a hold part for playback record write interval 351, the monitoring interval held by the monitoring interval hold part 352, and the monitoring records held by a monitoring record hold part 353, all of which are included in the secure storage unit 350. A description is given below of the verification processing for the playback history.

Verification Processing for Playback History

Figure 7:
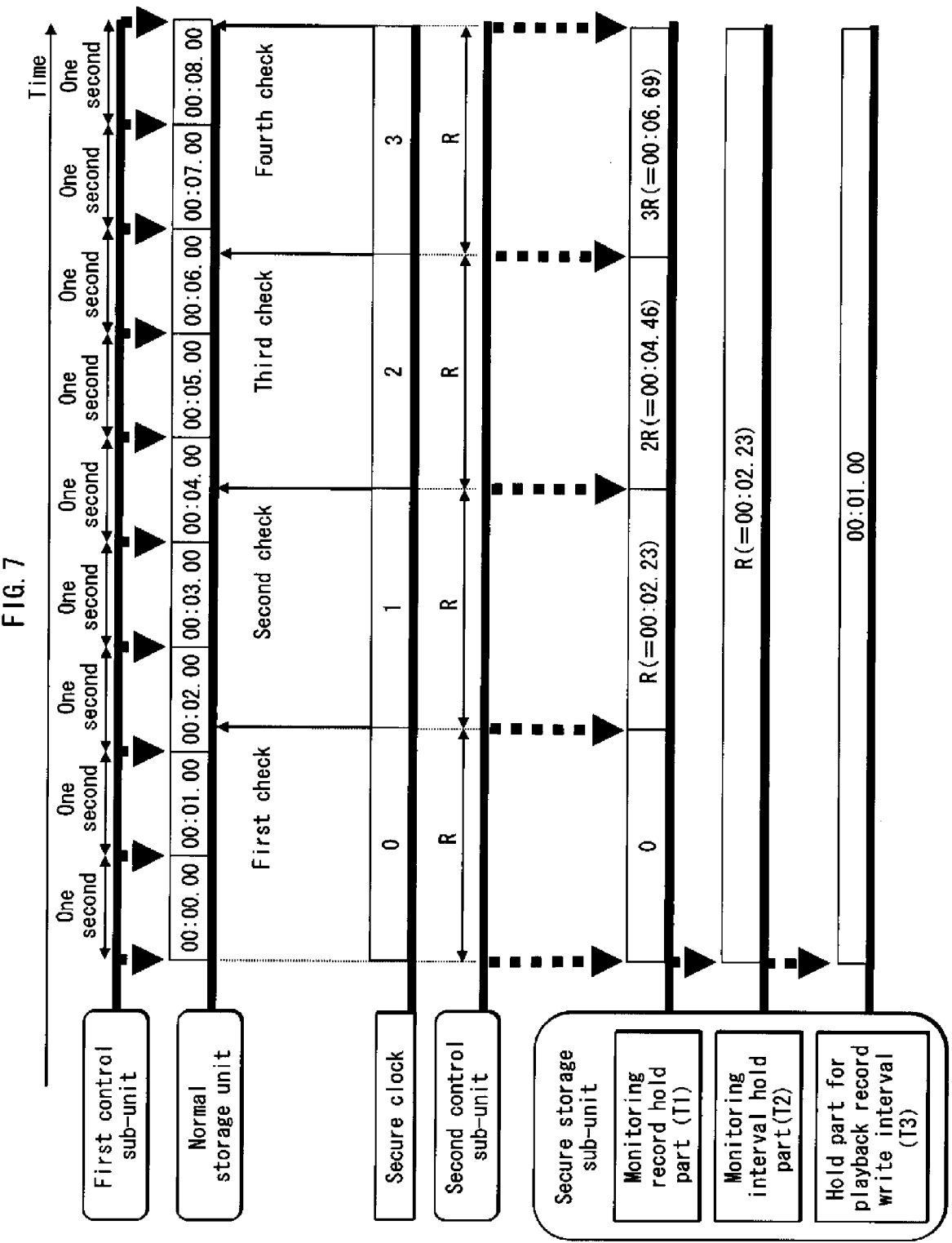
FIG. 7 shows a method for the content playback device 100 to monitor the playback history at regular time intervals according to the first embodiment of the present invention.

A description is given of the verification processing for the playback history in conjunction with FIG. 7.

FIG. 7 shows the temporal sequence of the processing performed by the first control sub-unit 230 and the second control sub-unit 330, as well as the data stored in the normal storage unit 250 and the secure storage unit 350 during the playback of the content. Note that the time axis proceeds from left to right in FIG. 7.

From the top, the first part indicates the processing performed by the first control sub-unit 230. Arrows in the first part indicate that the first control sub-unit 230 writes playback records one by one into the normal storage unit 250 at the playback record write intervals, namely every second, from the playback start. The playback record write interval is stored in the hold part for playback record write interval 351 of the secure storage unit 350.

The second part indicates the playback records written into the normal storage unit 250. Right after the playback start, the first control sub-unit 230 writes the initial time record "00:00:00" into the normal storage unit 250. The normal storage unit 250 stores only the time record "00:00:00" until one second later when the first control sub-unit 230 performs another writing. One second after the playback, the first control sub-unit 230 writes the time record "00:01:00" into the playback history stored in the normal storage unit 250. From then on, an additional time record is newly written every second into the normal storage unit 250.

The third part indicates the value of the secure clock 360. In this example, the monitoring interval R is set 2.23 seconds. The monitoring interval R is stored in the monitoring interval hold part 352 of the secure storage unit 350. The secure clock 360 increments the count value by one every 2.23 seconds, namely at the monitoring intervals.

The fourth part indicates the processing performed by the second control sub-unit 330. The second control sub-unit 330 is triggered by each count of the secure clock 360 to monitor the playback history stored in the normal storage unit 250. The second control sub-unit 330 then continuously writes monitoring time records at which the playback history is monitored into the monitoring record hold part 353 of the secure storage unit 350.

Since the monitoring does not occur right after the playback start, the second control sub-unit 330 writes the initial time record "00:00:00" into the secure storage unit 350. Upon the first monitoring at 2.23 seconds after the playback start, the second control sub-unit 330 writes the additional monitoring time record "00:02:23" into the secure storage unit 350. Then, upon the second monitoring at 4.46 seconds after the playback start, the second control sub-unit 330 writes the additional monitoring time record "00:04:46" into the secure storage unit 350.

The monitoring of the second control sub-unit 330 to see whether the playback history has not been tampered with is performed as follows. If the relation $S-T3 \leq T1+T2 \leq S+T3$ is satisfied among the latest monitoring record T1 in the monitoring history held in the monitoring record hold part 353, the monitoring interval T2 held in the monitoring interval hold part 352, the playback record write interval T3 held by the hold part for playback record write interval 351, and the maximum time value S in all the playback records listed in the playback history stored in the normal storage unit 250, the second control sub-unit 330 determines that the playback history has not been tampered with. If the above relation does not hold, the second control sub-unit 330 determines that the playback history has been tampered with. In this case, the second control sub-unit 330 stops the playback of the content, for example.

The above relation helps to determine whether a proper time record as expected has been written into the playback history at monitoring time.

In other words, T1 indicates the latest time at which it is checked that the tampering has not occurred, and the time T1+T2 is one monitoring interval T2 after T1, that is, the next monitoring time. The time record that is expected to have been written in the playback history in the monitoring time T1+T2 is a product of (i) the number of T3 included in T1+T2 and (ii) T3.

In FIG. 7, since T3=1, and two seconds are included in the monitoring time 2.23, the time record that is expected to have been added is S=2.00.

Since the playback records are incretmented by T3, it is suffice for the value S to establish the relation $T1+T2-T3 \leq S \leq T1+T2+T3$.

Thus, if this relation is satisfied, it is determined that the playback history has not been tampered with.

Note that the condition is relaxed with respect to the tampering for increasing the value S. Since the value S is the maximum time value listed in the playback history, the increased value S implies that the tamperer has altered the playback history so that the usage time of the content increases. Accordingly, even if the tampering for increasing the value S is determined according to the more or less relaxed condition, there is a low possibility that it causes disadvantage to the content provider.

Naturally, it is also possible for the second control sub-unit 330 to strictly determine whether the tampering for increasing the value S, by determining whether the relation $T1+T2-T3 \leq S \leq T1+T2$ is satisfied.

In addition, although in this example the playback record write interval is set to one second, the playback record write interval may be set appropriately according to the degree of delay tolerated for the callback timing.

Further, a different playback record write interval may be used for each content. For example, the following flexible control may be performed. That is to say, the strict check may be performed every second for the content associated with the strict right information depending on the second time scale, whereas the playback records are written only every minute for the content associated with relatively relaxed right information depending on the minute time scale.

This reduces processing load during the playback of the content. Further, the number of rewriting processes of the non-volatile memory, namely the normal storage unit 250 is reduced, thereby decreasing the size of the non-volatile memory and reducing the cost of the device.

Moreover, the monitoring record hold part 353 does not necessarily store the monitoring records, such as "00:02:23", "00:04:46", and "00:06:69" as described above. Instead, the monitoring record hold part 353 may store the counter values 1, 2, 3 . . . indicating the order in which the monitoring records have been written. In this case, the second control sub-unit 330 determines whether the above-described relation is satisfied, after calculating T1 with use of the counter values stored in the monitoring record hold part 353 and the monitoring interval held in the monitoring interval hold part 352.

Since the playback record write interval T3 is one second and the monitoring interval T2 is 2.23 seconds in this example, the maximum time value S expected to have been written is not identical to the monitoring time.

In the case in which one of the multiples of the playback record write interval T3 (i.e. one second), such as two, three, or four seconds, is used as the monitoring interval T2, it is suffice for the second control sub-unit 330 to determine whether T1+T2 matches the maximum time value S expected to have been written into.

In other words, the second control sub-unit 330 only needs to determine whether the monitoring history stored in the secure storage unit 350 corresponds to the playback history stored in the normal storage unit 250, according to the values of the playback record write interval T3 and monitoring interval T2.

Operations

Now, a description is given of the operations of the content playback device 100 according to the first embodiment of the present invention in conjunction with a flowchart.

The playback processing of the content playback device 100 is performed by the playback processing unit 200 that receives a playback start request and a playback stop request from the user and the secure processing unit 300 that performs secure processing regarding the integrity and privacy in the playback processing. The playback processing unit 200 and the secure processing unit 300 transmit and receive the request for and result of the playback processing to and from each other.

Operations of Playback Processing Unit 200

Figure 8:
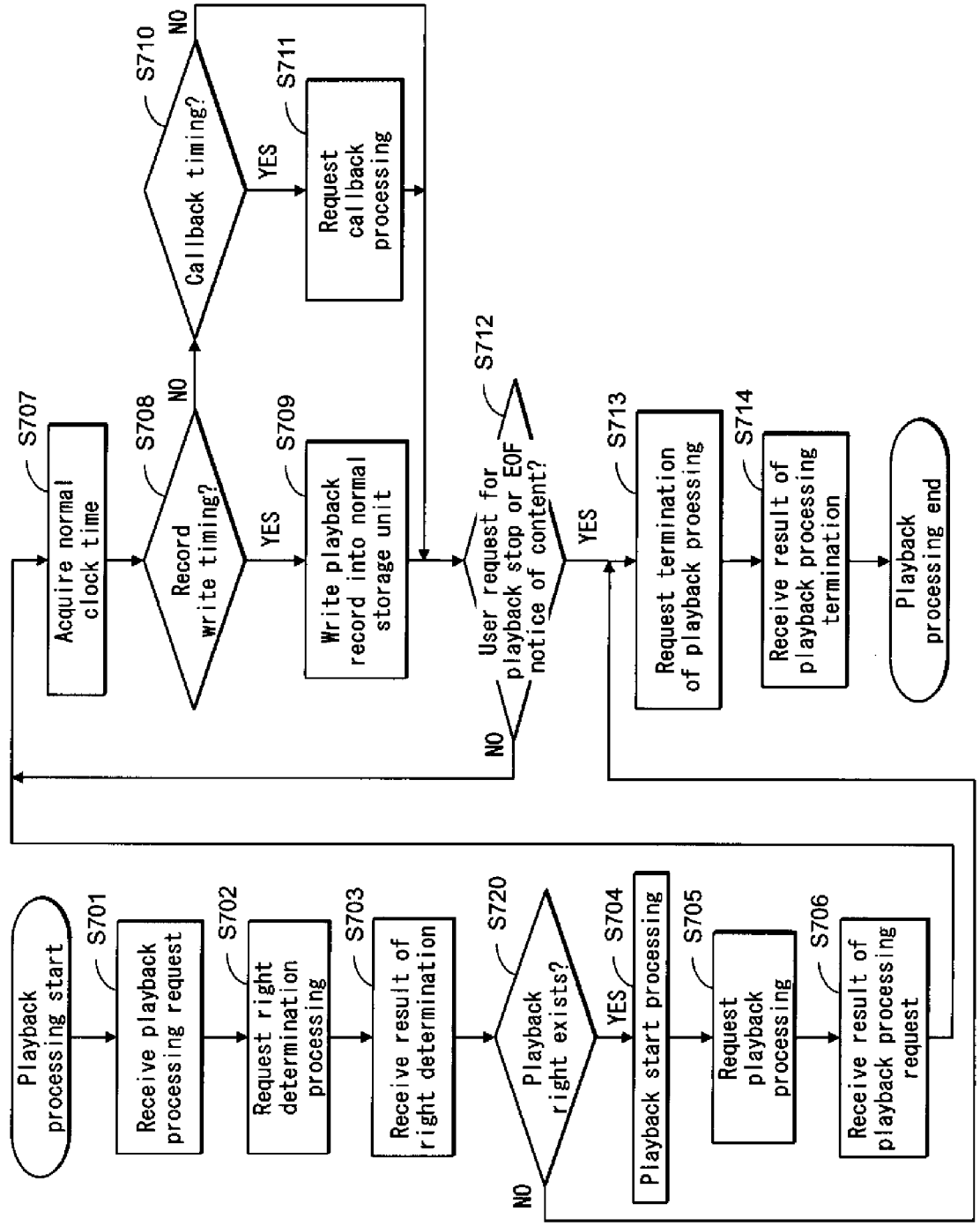
FIG. 8 is a flowchart showing operations of a playback processing unit 200 of the content playback device 100 according to the first embodiment of the present invention.

A description is given of the operations of the playback processing performed by the playback processing unit 200 in conjunction with FIG. 8.

Firstly, the playback processing reception sub-unit 210 receives the playback start request from the user (step S701). Specifically, this is a user operation to press a playback start button. The playback processing reception sub-unit 210 notifies the received playback start request to the playback processing control sub-unit 220.

Upon reception of the playback start request, the playback processing control sub-unit 220 requests the secure processing control sub-unit 320 to perform right determination processing (step S702). The right determination processing is processing for determining whether the playback right of the content whose playback is requested is still left.

The playback processing control sub-unit 220 acquires a result of the right determination processing from the secure processing control sub-unit 320 (step S703). If it is determined that the playback right is not left (NO in step S720), the playback processing control sub-unit 220 moves on to step S713 to terminate the playback processing.

If it is determined that the playback right is left (YES in step S720), the playback processing control sub-unit 220 requests the secure processing control sub-unit 320 to perform the content playback processing (step S705). Alternatively, the playback processing control sub-unit 220 may notify the user of the playback right consumption and wait for a user input indicating whether the user acknowledges the continuation of the playback processing before moving on to the playback processing.

After the playback processing result receptor 222 receives the result of the playback processing request from the secure processing control sub-unit 320 (step S706), the first control sub-unit 230 continuously performs playback record write processing for writing the playback records during the playback of the content. The result of the playback processing request in the embodiment is, for example, the information indicating the playback start. Or, the secure processing control sub-unit 320 may also return the parameter of the callback processing that is to be executed by the playback processing unit 200 in the future, along with the timing at which the callback processing is to be executed as the result of the playback processing request, by referring to the right management table. Thus, by causing the secure processing control sub-unit 320 to notify the playback processing control unit 220 of an appropriate timing for the callback, the callback processing is performed at an appropriate timing.

The playback record write processing includes the following processes. Firstly, the first control sub-unit 230 acquires the value of the normal clock 260 (step S707). If the acquired value indicates one of the timings to write the playback records (YES in step S708), the first control sub-unit 230 writes a playback record into the normal storage unit 250 (step S709).

The playback record write timing in this embodiment is when the value of the normal clock 260 is any one of the multiples of the playback record write interval. If the value of the normal clock 260 does not indicate one of the timings to write the playback records (NO in step S708), the first control sub-unit 230 determines whether it is the callback timing (step S710). If it is determined that it is the callback timing (YES in S710), the playback processing control sub-unit 220 requests the secure processing control sub-unit 320 to perform the callback processing (step S711).

If it is determined that it is not the callback timing (NO in step S710), the first control sub-unit 230 determines whether one of the stop request from the user and the notice indicating that content has been played back to the end and reached EOF (End of File) has been notified (step S712).

If none of the stop request and the EOF notice has not been notified (NO in step S712), the processing returns to step S707 from which the first control sub-unit 230 continues to write the playback records.

If one of the stop request and the EOF notice has been notified (YES in step S712), the playback processing control sub-unit 220 requests the secure processing control sub-unit 320 to terminate the playback processing (step S713).

Subsequently, the playback processing control sub-unit 220 acquires a result of the termination of the playback processing from the secure processing control sub-unit 320 (step S714), and the playback processing comes to an end.

Operations of Secure Processing Unit 300

Figure 9:
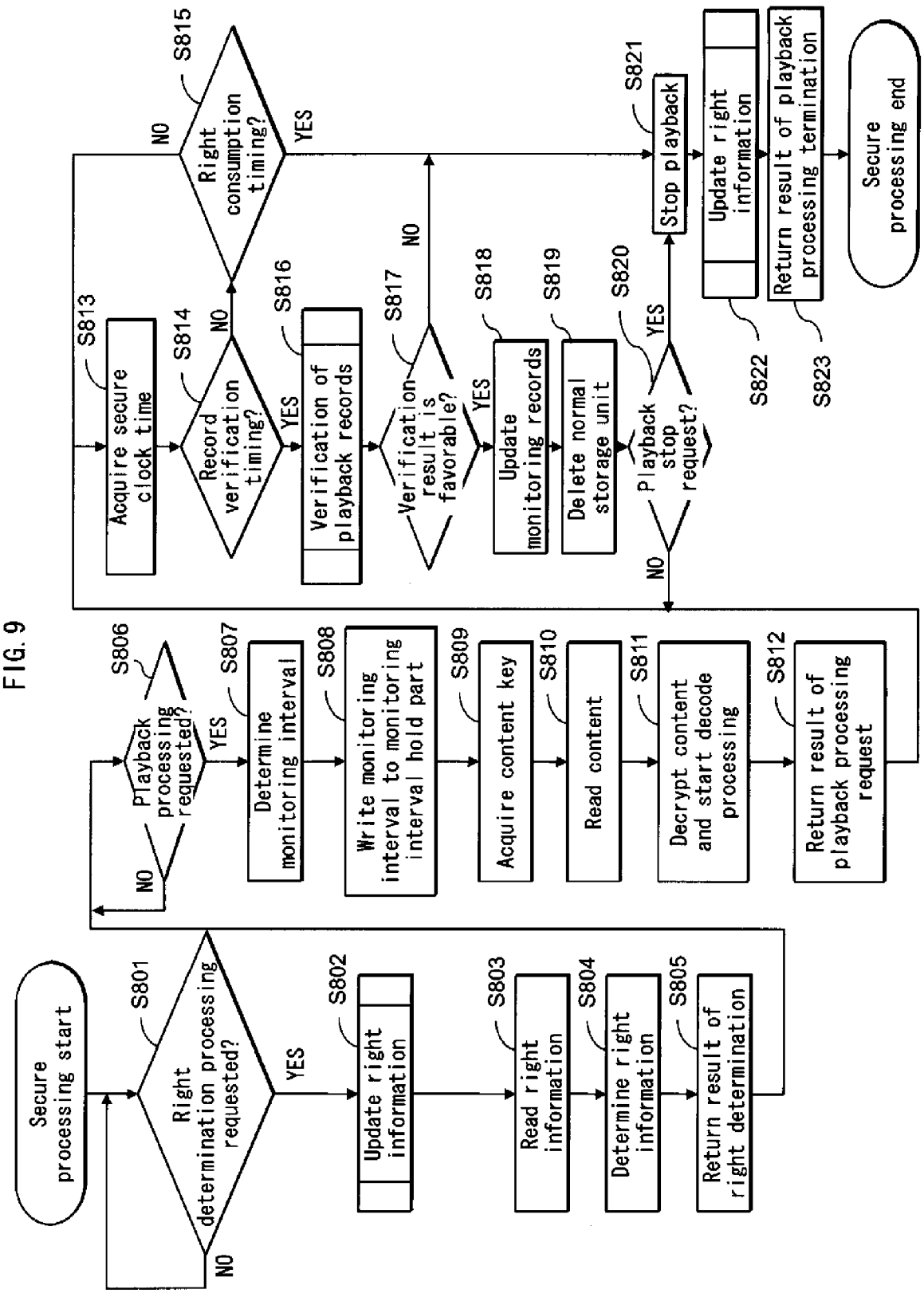
FIG. 9 is a flowchart showing operations of a secure processing unit 300 of the content playback device 100 according to the first embodiment of the present invention.

A description is given of the operations of the secure processing performed by the secure processing unit 300 in conjunction with the flowchart of FIG. 9. The operations of the secure processing are performed by the secure processing unit 300 upon reception of the request for the right determination in step S702 in FIG. 8.

The secure processing unit 300 waits to start processing until the secure processing control sub-unit 320 receives the request for the right determination processing from the playback processing control sub-unit 220 (NO in step S801).

Upon reception of the request for the right determination processing (YES in step S801), the right consumption processing sub-unit 410 updates the right information (step S802). The right information update processing is processing for consuming the right information according to the playback history stored in the normal storage unit 250 and the monitoring history stored in the secure storage unit 350.

The playback history and monitoring history are deleted by the later-described operations of updating the right information once the playback operations end properly. If the playback history is stored in the normal storage unit 250 and the monitoring history is stored in the secure storage unit 350 without having been deleted prior to the playback, this means that the right consumption has not been performed in the previous playback due to the unexpected power-off and such. The right information therefore must be surely updated at this moment. Meanwhile, the right information update processing is described later.

Subsequent to the update of the right information, the right consumption processing sub-unit 410 reads the right information associated with the content whose playback is requested, from the right management table held in the right storage unit 430 through the right storage control unit 420 (step S803).

The right consumption processing sub-unit 410 determines whether the playback right is left with use of the read right information (step S804) and returns the determination result to the playback processing control sub-unit 220 through the secure processing control sub-unit 320 (step S805).

Then, the secure processing control sub-unit 320 waits until it receives the request for playback processing from the playback processing control sub-unit 220 (step S805).

Upon reception of the request for playback processing (YES in step S806), the monitoring interval determination unit 334 determines the monitoring interval (step S807), and the monitoring interval hold part 352 of the secure storage unit 350 holds the monitoring interval determined in the step S807 (step S808). In this embodiment, the monitoring interval determination unit 334 determines the monitoring interval by means of the random number generator.

Subsequently, the right consumption processing sub-unit 410 acquires the content key corresponding to the content whose playback is requested, from the right management table through the right storage control unit 420 (step S809).

The content playback processing sub-unit 440 reads the encrypted content corresponding to the content, from the content storage unit 460 through the content storage control sub-unit 450 (step S810).

The content playback processing sub-unit 440 decrypts the encrypted content with use of the content key acquired by the right consumption processing sub-unit 410, and then decodes the decrypted content to play it back (step S811). The secure processing control sub-unit 320 returns to the playback processing control sub-unit 220 the result of the playback processing request indicating that the playback has been started (step S812).

Subsequently, the second control sub-unit 330 starts the processing for monitoring the content being played back.

Firstly, the second control sub-unit 330 reads the value of the secure clock 360 through the secure clock acquisition sub-unit 340 at regular time intervals (step S813). Secondly, the second control sub-unit 330 determines whether the read value of the secure clock 360 indicates one of the timings at which the playback history is to be monitored (step S814). The monitoring timing in this embodiment is when the value of the secure clock 360 is any one of the multiples of the monitoring interval.

If it is determined that the secure clock 360 indicates one of the monitoring timings (YES in step S814), the second control sub-unit 330 verifies whether the playback history has not been tampered with (step S816). The verification process for the playback history is described later. If the verification result is favorable and it is determined that the playback history has not been tampered with (YES in step S817), the second control sub-unit 330 updates the monitoring history (step S818). In other words, the second control sub-unit 330 writes into the secure storage unit 350 the monitoring record at which the second control sub-unit 330 performed the latest monitoring. On the other hand, if the verification result is unfavorable and it is determined that the playback history has been tampered with (NO in step S817), the secure processing unit 300 stops the playback (step S821).

The second control sub-unit 330 then deletes the normal storage unit 250 (step S819). Such a deletion is done by deleting all the playback records but the latest one.

If not receiving the playback stop request (YES in step S820), the secure processing unit 300 returns to step S813 to continue the monitoring processing for the playback history. If receiving the playback stop request (NO in step S820), the secure processing unit 300 stops the playback (step S821).

On the other hand, if it is determined that the secure clock 360 does not indicate one of the monitoring timings (NO in step S814), the second control sub-unit 330 verifies whether it is the right consumption timing (step S816). The right consumption timing is when the playback right has been entirely consumed. If it is determined it is not the timing to perform right consumption (NO in step S815), the secure processing unit 300 returns to the step S813 to continue the monitoring processing for the playback history. If it is determined it is the timing to perform the right consumption (YES in step S815), the secure processing unit 300 stops the playback (step S821).

Once the playback stops due to the playback stop request or the right consumption (step S821), the right consumption processing sub-unit 410 updates the right information (step S822). The secure processing control sub-unit 320 then returns the termination result of the playback processing to the playback processing control sub-unit 220 (step S823), and the secure processing comes to an end.

Operations for Verification of Playback History

Figure 10:
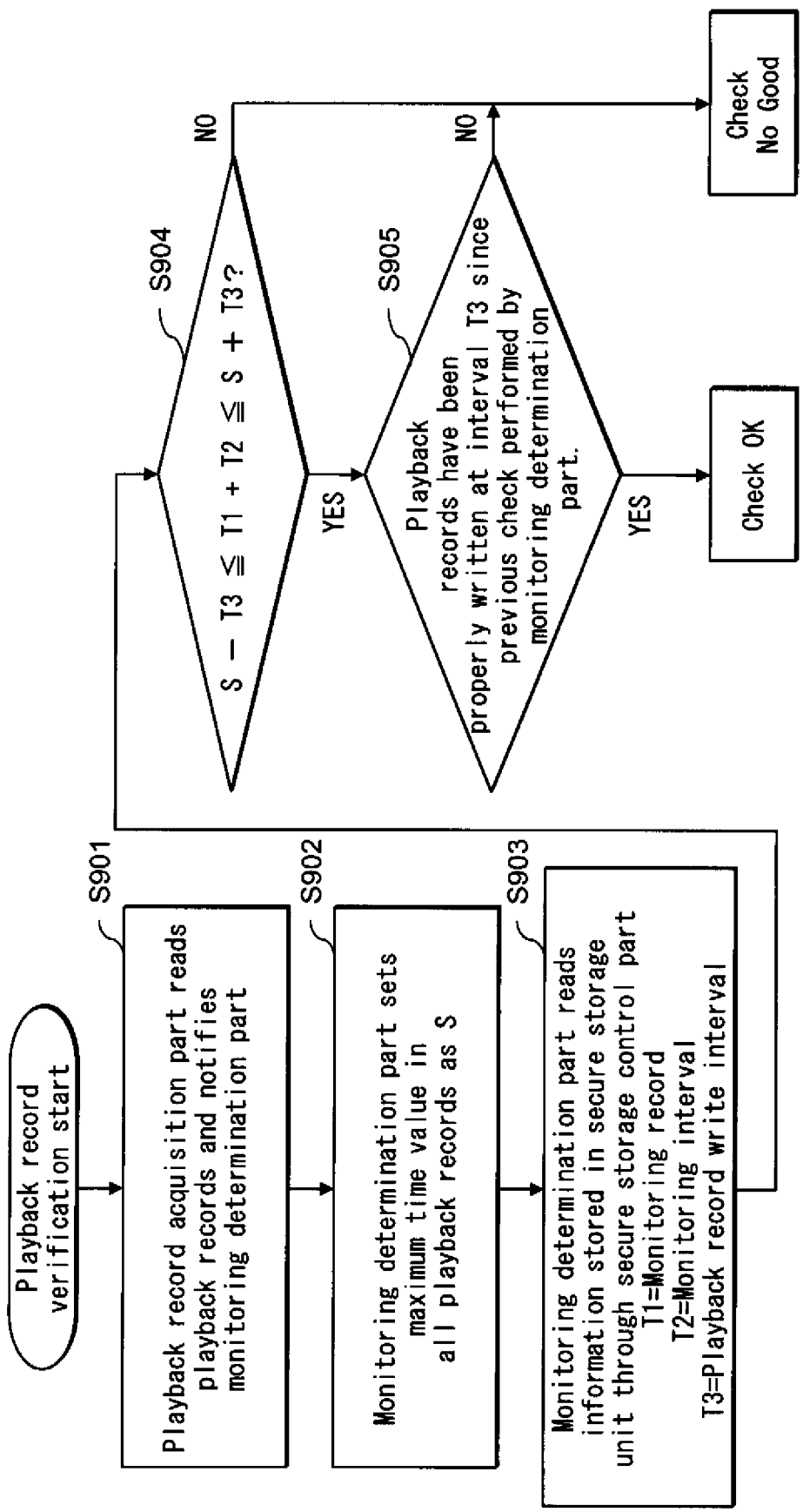
FIG. 10 is a flowchart showing operations of a playback history verification process performed by the secure processing unit 300 of the content playback device 100 according to the first embodiment of the present invention.

A description is given of the operations for the verification of the playback history in conjunction with the flowchart of FIG. 10. The operations in this description are performed in the step S816 of FIG. 9.

Firstly, the second control sub-unit 330 acquires the playback records stored in the normal storage unit 250 through the playback record acquisition part 331, and notifies the acquired playback records to the monitoring determination part 332 (step S901).

The monitoring determination part 332 sets the maximum time value in all the playback records written in the playback history as S (step S902).

Secondly, the monitoring determination part 332 acquires the latest one of the monitoring records, monitoring interval, and playback record write interval, from the monitoring record hold part 353, the monitoring interval hold part 352, and the hold part for playback record write interval 351, respectively, and assume them to be T1, T2, and T3, respectively (step S903).

The monitoring determination part 332 determines whether the relation $S-T3 \leq T1+T2 \leq S+T3$ is satisfied among the acquired four parameters S, T1, T2, and T3 (step S904).

If it is determined that the above relation is not satisfied (NO in step S904), the monitoring determination part 332 assumes that the playback history has been tampered with and checks NO GOOD.

If it is determined that the above relation is satisfied (YES in step S904), the monitoring determination part 332 further determines whether the playback record that indicates one playback record write interval T3 after the previous monitoring has been written in the playback history (step S905).

If it is determined negatively (N step S905), the monitoring determination part 332 determines that improper processing has been executed on the playback history and checks NO GOOD. If it is determined positively (YES in step S905), since the playback records have been written at the proper playback record write interval T3, the monitoring determination part 332 determines that the improper processing has not been executed on the playback history and checks OK.

The improper processing in the description is, for example, replacing one of the playback records with something else and bypassing the playback record write processing. Processing performed after the check of NO GOOD is, for example, that the content playback processing sub-unit 440 promptly stops the playback of the content.

Operations for Update of Right information

Figure 11:
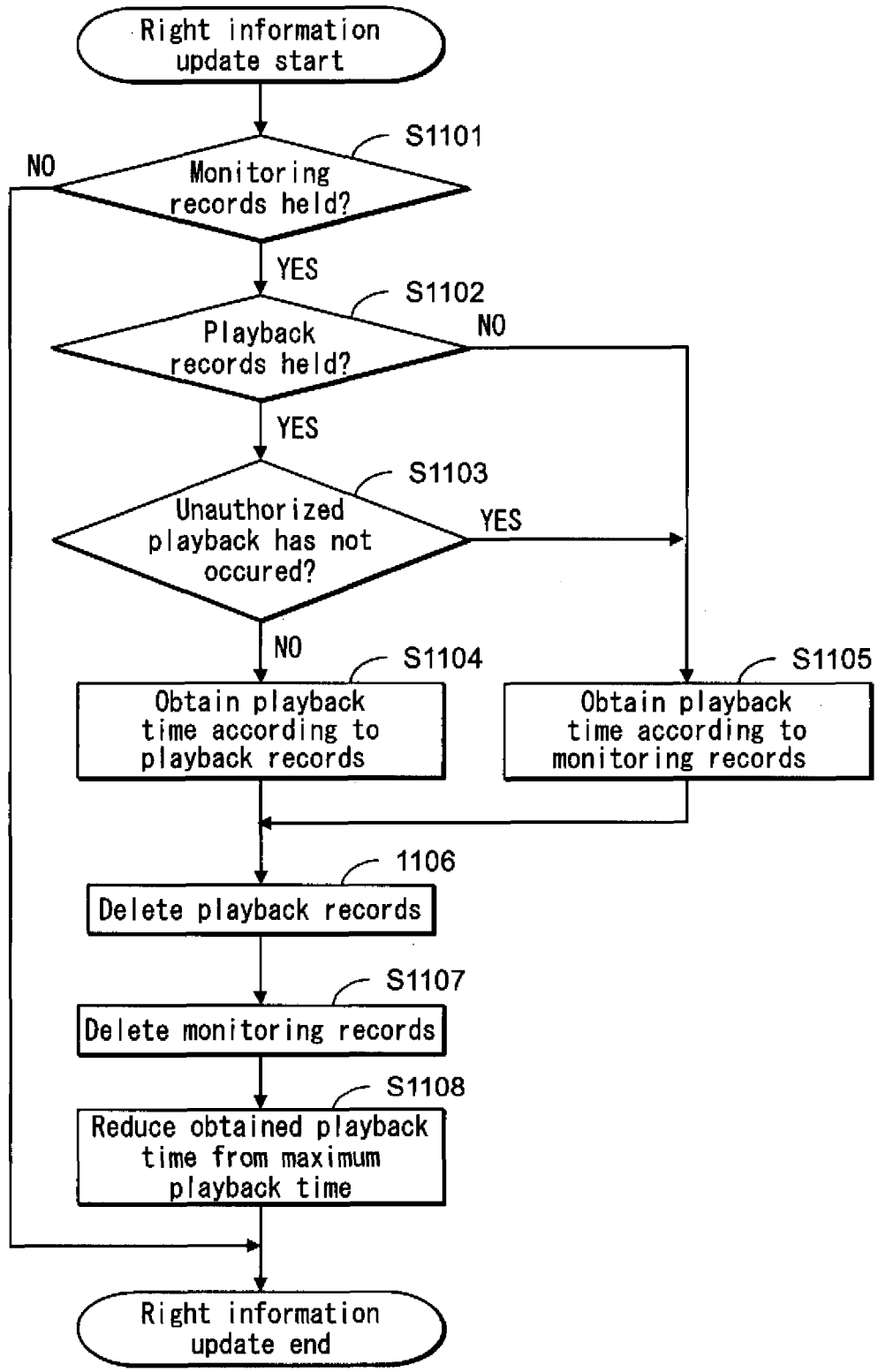
FIG. 11 is a flowchart showing operations of a right information update process performed by the secure processing unit 300 of the content playback device 100 according to the first embodiment of the present invention.

A description is given of the operations for the update of the right information in conjunction with the flowchart of FIG. 11. The operations in this description are performed in the steps S802 and S822 of FIG. 9.

Firstly, the second control sub-unit 330 determines whether the monitoring history is held in the monitoring record hold part 353 of the secure storage unit 350 (step S1101). If it is determined that the monitoring history is not held (NO in step S1101), since there is no right information to be updated, the second control sub-unit 330 terminates the processing.

If it is determined that the monitoring history is held (YES in step S1101), the second control sub-unit 330 further determines whether the playback history is held in the normal storage unit 250 (step S1102).

If it is determined that the playback history is held (YES in step S1102), the second control sub-unit 330 checks whether unauthorized playback has been performed, according to the playback history and monitoring history (step S1103). The checking for the unauthorized playback is performed by determining whether the relation $S-T3 \leq T1+T2 \leq S+T3$ is satisfied, as is similar to the case of the verification for the playback history.

If it is determined that the unauthorized playback has not been performed (NO in step S1103), the latest playback record in the playback history is acquired (step S1104). Then, the second control sub-unit 330 deletes the playback and monitoring histories (steps S1106 and S1107).

On the other hand, if it is determined that the monitoring history is not held (NO in step S1102), or even when the monitoring history is held, if it is determined that the unauthorized playback has been performed (YES in step S1103), the latest monitoring record in the monitoring history is acquired as the playback time (step S1105). This is because that, since the elapsed playback time written in the playback history is untrustworthy, the latest and trustworthy time record written in the monitoring history is used as the playback time. Then, the second control sub-unit 330 deletes the playback history and monitoring history (steps S1106 and S1107).

Lastly, the right consumption processing sub-unit 410 reduces the amount of time acquired from the playback history or monitoring history (step S1108) from the available playback time remaining in the right table stored in the right storage unit 430 or increases the accumulated playback time. This terminates the update of the right information.

In addition, in this description, only the amount of the right information corresponding to the information stored in the monitoring history is consumed in the case in which it is determined that the unauthorized playback has been performed in the verification for the playback history. However, the playback may be stopped as soon as the unauthorized playback is detected. It is also possible to notify a distribution server distributing the content that the unauthorized playback has occurred, increase the consumption amount of the right information, or perform some processing disadvantageous to the unauthorized analyst. These prevent the tampering of the playback history.

Second Embodiment

The following describes the content playback device according to a second embodiment of the present invention.

The second embodiment differs from the first embodiment in the following point. In the first embodiment, the monitoring intervals for the content are each regular time periods determined by the monitoring interval determination unit 334. On the other hand, in this embodiment, the monitoring interval is newly determined every time the second control sub-unit 330 performs the monitoring. The first and second embodiments are identical apart from that.

Figure 12:
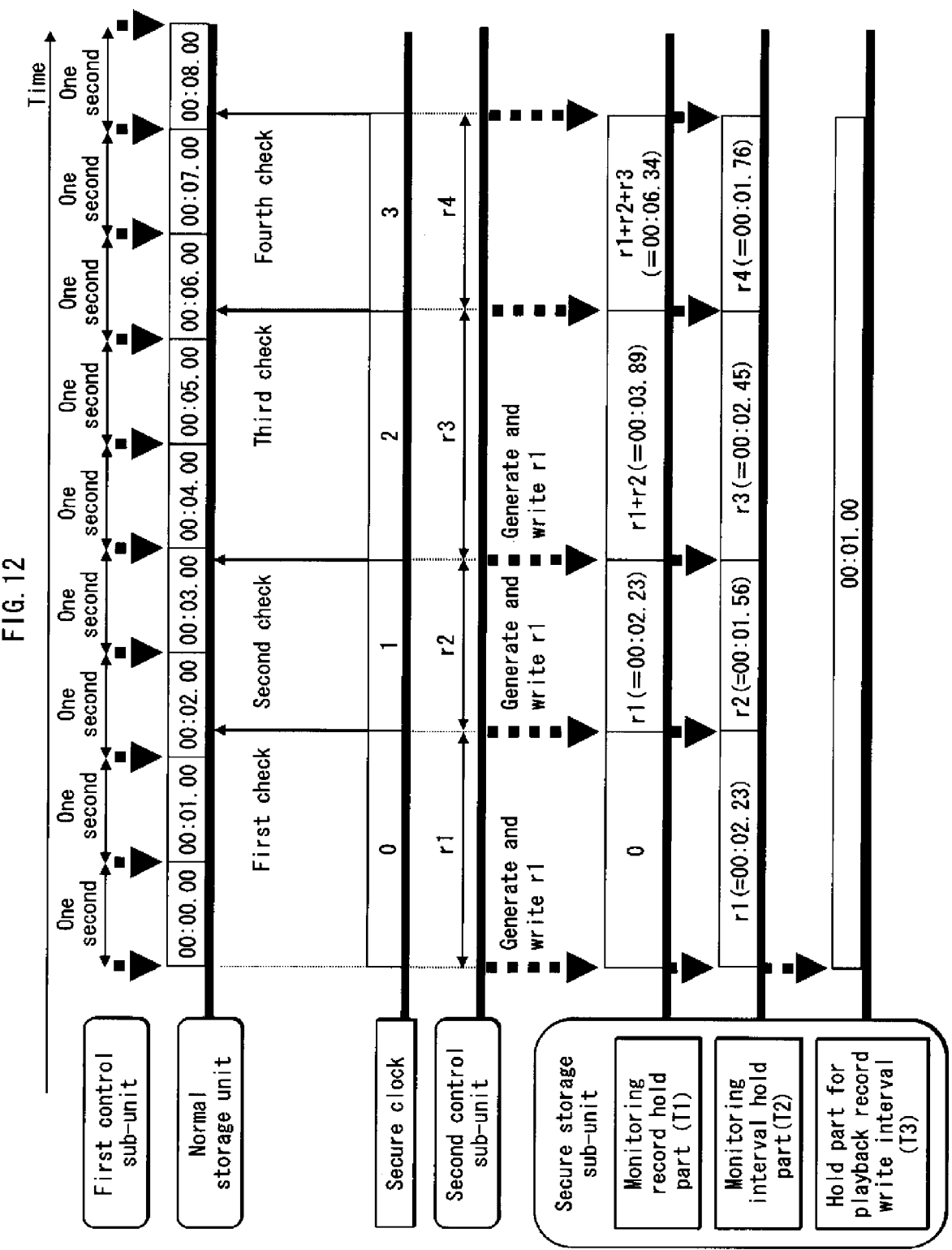
FIG. 12 shows a method for the content playback device 100 to monitor the playback history at irregular time intervals according to a second embodiment of the present invention.

FIG. 12 shows the temporal sequence of the processing performed by the first control sub-unit 230 and the second control sub-unit 330, as well as the data stored in the normal storage unit 250 and the secure storage unit 350 during the playback of the content in the second embodiment.

In comparison with FIG. 7, the monitoring interval varies on each monitoring in FIG. 12, as indicated by r1 (2.23 seconds), and r2 (1.56 seconds) . . . .

In other words, in the second embodiment, the monitoring interval determination unit 334 determines a new monitoring interval each time the monitoring determination part 332 checks the playback history. The monitoring interval hold part 352 is updated with the determined new monitoring interval. The processing for, for example, checking whether the playback history has been tampered with is the same as the first embodiment. According to the present embodiment, the monitoring timings are less predictable for the malicious user who attempts to tamper with the playback history by modifying based on the monitoring operations. Even if the tampering is accidentally succeeded at a certain timing, since the next monitoring timing is newly set, the attempt to make another tampering at the same timing as the previous time is fails.

In addition, like the first embodiment, the monitoring intervals may be determined based on the random numbers.

It is also possible to store a table listing various predetermined monitoring intervals in the secure storage unit 350 in advance, and select one monitoring interval at a time from the stored table.

Further, a predetermined rule may be stored in the secure storage unit 350 so as to vary the monitoring interval in accordance with the predetermined rule. In this case, the monitoring intervals are determined in accordance with the rule that is, for example, to increase or decrease the monitoring interval time at regular time intervals.

Note that since the monitoring timings are unknown to the playback processing unit 200 in the present embodiment also, the safety is maintained simply by updating the monitoring interval at some frequency even without using the random numbers.

Operations for Update of Monitoring History

The operations of the secure processing unit 300 in the second embodiment differs from the first embodiment only in the point that the monitoring interval is reset at the end of each monitoring.

Figure 13:
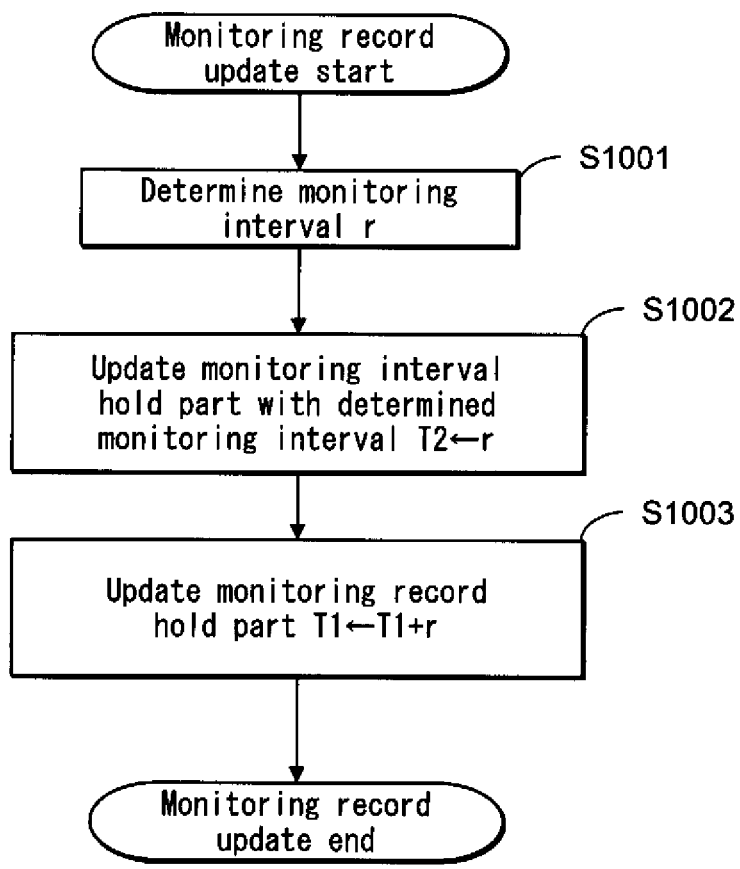
FIG. 13 is a flowchart showing operations of a monitoring interval update process performed by the secure processing unit 300 of the content playback device 100 according to a second embodiment of the present invention.

Specifically, in the present embodiment, monitoring interval update processing shown in FIG. 13 is inserted between the update process for the monitoring history (step S818) and the deleting process for the playback record storage unit (step S819) shown in FIG. 9.

As shown in FIG. 13, the following processes are performed in the monitoring interval update processing.

After updating the monitoring history, the monitoring interval determination unit 334 determines a new monitoring interval r (step S1001). The value T2 held in the monitoring interval hold part 352 is updated with the monitoring interval r determined in the step S1001 (step S1002). Subsequently, the value T1 held in monitoring record hold part 353 is updated with T1+r (step S1003).

This concludes the description of the update for the monitoring history.

Third Embodiment

The following describes the content playback device according to a third embodiment of the present invention.

The third embodiment differs from the first embodiment in the point that the playback records are written in correspondence with playback processing commands. The first and third embodiments are identical apart from that.

In the first embodiment, only the records of the time elapsed during the playback are stored as the playback records in the playback history for each content ID, as shown in FIG. 2. On the other hand, in the present embodiment, the playback records and the playback processing commands are stored in one-to-one correspondence.

By storing the playback records in correspondence with the playback processing commands as mentioned above, the present embodiment counts or remove the time spent for the fast-forward and rewind in or from the time specified for the right consumption.

Figure 14:
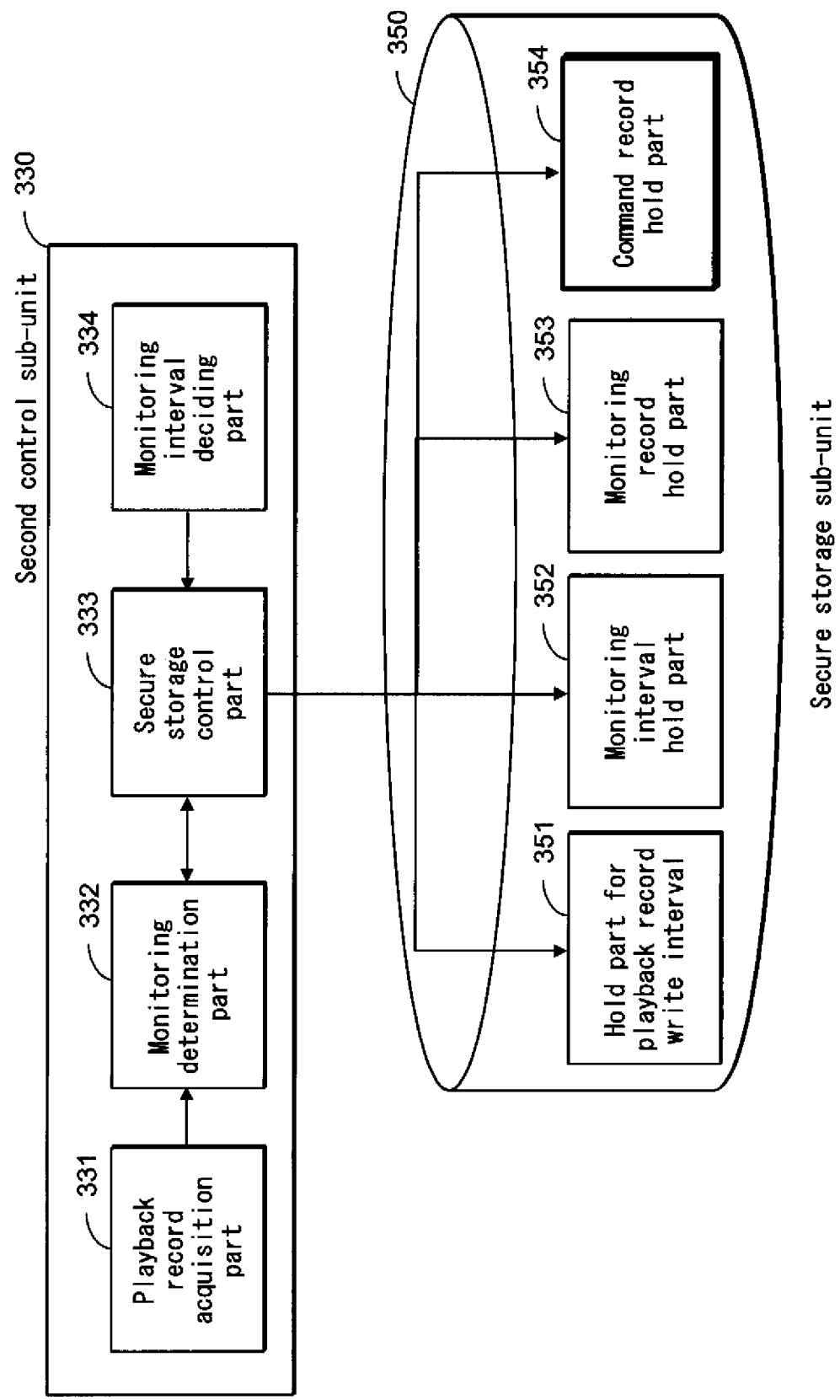
FIG. 14 shows internal structures of the second control sub-unit 330 and the secure storage unit 350 of the content playback device 100 according to a third embodiment of the present invention.

As shown in FIG. 14, the content playback device in this embodiment further includes the command record hold part 354 as an additional component in the secure storage unit 350 of the content playback device 100.

FIG. 15A and FIG. 15B each show the playback records written into the normal storage unit 250 by the first control sub-unit 230. In the present embodiment also, the first control sub-unit 230 writes the playback records one by one every second during the playback of each content.

FIG. 15A shows the playback history for the content identified by the content ID "001". The figure shows the following. Since the playback processing type is "play" within three seconds after the playback start, the playback processing has been performed for the content. Since the playback processing type is "seek" four and five seconds after the playback start, the seek processing has been performed for the content. The playback processing has been performed again six seconds after the playback start.

The right type associated with the content identified by the content ID "001" is the accumulated playback time type 1. As has been described in the first embodiment, the seek processing time is also counted in the accumulated playback time in the accumulated playback time type 1. Accordingly, regarding the content identified by the content ID "001", the accumulated playback time is calculated regardless of whether the playback processing type is "seek" or not. It can be seen from the playback history shown in FIG. 15A that the accumulated playback time is calculated to be six seconds.

FIG. 15B shows the playback history for the content identified by the content ID "002". The figure shows the following. The playback processing has been performed for the content for two seconds after the playback start. The seek processing has been performed from three to five seconds after the playback start, and the playback processing has been performed again six seconds after the playback.

The right type associated with the content identified by the content ID "002" is the accumulated playback time type 2. As has been described in the first embodiment, the seek processing time is not counted in the accumulated playback time in the accumulated playback time type 2. Accordingly, regarding the content identified by the content ID "002", the accumulated playback time is calculated without taking the seek processing time into calculation. It can be seen from the playback history shown in FIG. 15B that the accumulated playback time is calculated to be four seconds.

The second control sub-unit 330 in the present embodiment stores the records of the executed playback processing commands in the command record hold part 354, based on the playback histories of FIG. 15A and FIG. 15B. As a result, the command record hold part 354 stores command hold tables as shown in FIG. 16A and FIG. 16B.

The command hold table of FIG. 16A corresponds to the playback history of FIG. 15A, and the command hold table of FIG. 16B corresponds to the playback history of FIG. 15B.

The playback records and the corresponding playback processing commands are written into the normal storage unit 250 every second. On the other hand, each command hold table is updated only when the user has newly issued a request for the playback processing command.

In the FIG. 15B example, the user issues the playback request for the playback start, issues the seek processing request three seconds after the playback start, and issues the playback request six seconds after the playback start again. Accordingly, in order to request the playback processing commands, the playback processing unit 200 requests the secure processing unit 300 to execute the playback processing commands three times. As a result, "play", "seek", and "play" are written into the command hold table at zero second, three seconds, and six seconds, respectively.

By storing the command hold table as mentioned above, the present embodiment performs the right consumption for the content imposed with the restriction on the playback expiration deadline, even when the seek processing is not counted in the accumulated playback time as in the accumulated playback time type 2. Thus, the present embodiment enables the content playback device to cope with a wider variety of right consumption types.

Further, with the method for checking which part of the content corresponds to the playback processing type "play", the present embodiment is also applicable for checking whether a certain part corresponding to a specific scene contained in a movie content has been played back, for example.

Moreover, in the present embodiment, the playback processing unit 200 notifies the playback processing commands, such as skip, to the secure processing unit 300. By this means, as long as the monitoring side stores the monitoring timings occurred within the certain part as the monitoring records, it is possible to check whether the playback side properly stores the fact that it played back the certain part as the playback records.

In addition, although in this description the content playback device of the third embodiment has the same structure as the first embodiment, this is not limiting. For example, the content playback device of the third embodiment may have the structure identical to the second embodiment.

In this case, the command record hold part 354 is added to the secure storage unit 350. Unlike the first embodiment, the monitoring interval is newly determined every time the second control sub-unit 330 performs the monitoring as described in the second embodiment. Apart from the method for determining the monitoring history, the operations performed in the present embodiment are the same as the third embodiment.

Other Modifications

Although the present invention has been described according to the above embodiments, the present invention is not limited to these embodiments. The following modifications are also within the scope of the present invention.

(1) In the first to third embodiments, playback records are written one by one every second into the normal storage unit 250. In other words, the normal storage unit 250 stores more and more playback records as the playback goes on. However, the present invention is not limited to this.

For example, the normal storage unit 250 may always store the latest playback record only. In this case, the first control sub-unit 230 updates the latest playback record stored in the normal storage unit 250 at timings at which the playback records are to be stored. This reduces the volume of the normal storage unit 250 required for the storage of the playback records even if the content is long.

Further, in the case in which the normal storage unit 250 is embodied by the flash memory, the playback records need to be stored in several cells somewhat dispersed around the memory so as not to shorten the life of the memory. In this case, like the above-described first to third embodiments, it is preferable to store the playback records in dispersed cells.

(2) Although in the first to third embodiments the playback records are written into the normal storage unit 250 at the regular time intervals, the present invention is not limited to these embodiments. For example, the write timings at which the playback records are written into the normal storage unit 250 may be determined randomly.

In this case, the playback record write intervals and the playback record monitoring intervals must be adjusted so as to prevent an erroneous determination by secure processing unit 300. For example, it is possible to generate random numbers within a range that the write intervals are always shorter than the monitoring intervals, and determine the write intervals according to the random numbers.

Further, in the case in which the content has a plurality of parts with different priorities, the playback of the part with a high priority may be recorded intensively. For example, the write interval may be shortened for the part with a high priority and lengthened for the part with a low priority. In this case also, it is preferable to vary the monitoring timings in accordance with the playback record write timings so as to prevent the erroneous determination by secure processing unit 300. Specifically, the monitoring interval may be shortened in accordance with the priorities placed on various parts of the content.

(3) Although the specific descriptions are given of the playback record update timings and playback record monitoring timings in the first to third embodiments, the update and monitoring timings in the present invention are not limited to these descriptions.

In the present invention, it is suffice to set the monitoring intervals longer than the write intervals, and any implementation method may be used.

In addition, the term "interval" described in the present invention and the first to third embodiments is not necessarily a regular time period and may vary, as can be clearly understood from the determination method for the "monitoring intervals" in the second embodiment. It is suffice to set the monitoring frequency for the playback records less than the update frequency for the playback records to reduce the number of rewriting processes of the secure memory.

(4) When the monitoring interval is determined randomly using the random number as in the first and second embodiments, it sometimes happens that the monitoring interval occurs for a plurality of times in a single write interval depending on the random number. In this case, the relation S−T3≦T1+T2≦S+T3 may not hold, thereby triggering the erroneous determination. The problem is solved by adjusting the range of available random numbers so that the monitoring interval is always longer than the write interval.

Further, the secure processing unit 300 naturally knows the value of the write interval T3 to check whether the relation S−T3≦T1+T2≦S+T3 is satisfied. Accordingly, the secure processing unit 300 may change the standard for determination once it is determined that the randomly determined monitoring interval is shorter than T3. Specifically, the secure processing unit 300 may determine the number of update timings occurring in one monitoring interval from the latest monitoring record T1 to the next monitoring time. If it is determined that the number is zero, the monitoring is always considered to have succeeded.

However, in the case in which the monitoring interval occurs for a plurality of times in the single write interval, the monitoring time is T1+T2 even right after the update timing as the monitoring interval occurs for several times. Accordingly, it is also necessary to determine that the monitoring has succeeded, even if the relation S−T3≦T1+T2≦S+T3 is satisfied.

By doing so, the erroneous determination is prevented even when the monitoring interval is accidentally longer than the write interval.

In addition, the update frequency of the secure storage unit 350 may be temporarily higher than the update frequency of the normal storage unit 250. Although the update frequency may be temporarily higher in the secure storage unit 350, the objective of the present invention is achieved as long as the overall update frequency of the secure storage unit 350 is lower than the normal storage unit 250 in the long term statistic.

Accordingly, the scope of the present invention includes the case in which the range of the random numbers are set so that the update frequency is lower in the secure storage unit 350 at least in a predetermined time period while the update frequency of the secure storage unit 350 is infrequently higher than the normal storage unit 250.

(5) Although in the first to third embodiments the monitoring intervals are determined base on the random numbers and stored in the monitoring interval hold part 352, the present invention is not limited to these embodiments.

In the present invention, seed values required for the determination of the monitoring intervals may be stored instead of the monitoring intervals itself. In this case, it is suffice for the monitoring interval determination unit 334 to have the function of generating the monitoring intervals when the seed values are input, in accordance with a predetermined algorithm. The algorithm for generating the monitoring intervals based on the seed values is, for example, a one-way hash function algorithm and other algorithm for generating the random numbers based on the seed values.

(6) Although in the third embodiment the playback processing types and the playback records are stored in such a manner that they correspond to each other, the present invention is not limited to the embodiment.

For example, it is also possible to store the playback processing types and the monitoring records in correspondence with each other. In the case in which the accumulated playback time is calculated according to the monitoring records, the control is performed by referring to the playback processing type information so that the monitoring records associated with information indicating specific playback types, such as "seek" indicating the seek processing, are not counted as the accumulated playback time.

(7) In the first to third embodiments, the second control subunit 330 may determine the interval for the normal clock 260. As a method for the determination, for example, the interval may be determined randomly within a range in which the monitoring records are written at a higher frequency than the playback records are.

(8) Although in the first to third embodiments the callback processing occurs depending on the playback time of the content, the callback processing may occur depending on the time for which some processing is performed.

For example, the callback processing may occur depending on the time spent for the rewind or fast-forward processing, and the copying or move processing.

In this case, it is necessary to measure the processing time accurately and safely in order to perform the callback processing at a proper timing. For this purpose, like the method described in the first to third embodiments, it is preferable to measure the processing time while prolonging the life of the secure memory.

The above-described measurement is done, simply by switching the target for the time measurement from the playback to corresponding processing, such as the rewind, fast-forward, copying, and move processing. Accordingly, a detailed description of the present modification is omitted here.

(9) The devices of the above embodiments and modifications may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

(10) A portion or all of the constituent elements of the devices of the above embodiments and modifications may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program. The constituent elements may each be made into a single and separate chip, or may be made into a single chip including a portion or all portions thereof. The LSI referred to here is also called an IC, a system LSI, a super LSI, or an ultra LSI depending on the degree of integration. Also, the integration is not limited to LSI implementation, but instead may be realized by a dedicated circuit. A field programmable gate array (FPGA) or a silicon flexible processor in which the connection and settings of circuit cells in the LSI can be restructured after LSI manufacture can also be used. Furthermore, if integration technology is developed that replaces LSIs due to the progress in semiconductor technology and other derivative technologies, integration of functional blocks using this technology is naturally possible. For example, the application of biotechnology is a possibility.

(11) A portion or all of the constituent elements of the devices of the above embodiments and modifications may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper-resistant.

(12) The present invention may be the methods shown above.

Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Furthermore, the present invention may be a computer system that includes a microprocessor operating according to the computer programs and a memory storing the computer programs.

Also, the present invention may be carried out by another independent computer system by transferring the programs or the digital signals which have been recorded on the recording media, or by transferring the programs or the digital signals via the network, etc.

(13) The present invention may be any combination of the above embodiment and modifications.

INDUSTRIAL APPLICABILITY

A device of the present invention can be used in the manufacturing and distribution industries of the electronic devices implementing content copyright protection technology, such as DRM, as a technique for storing playback records at a high frequency without using a large-volume secure memory. Further, the present invention stops the playback of the content as soon as the playback right has been consumed, even during the playback. Since the playback records are monitored at the regular time intervals, the tampering is prevented. The present invention is also used as a technique that copes with an unexpected power-off, by performing proper right consumption based on the playback and monitoring records.

The invention claimed is:

1. A content playback device, comprising:
a playback unit configured to play back a content;
a normal storage unit that is not tamper-resistant;
a secure storage unit that is tamper-resistant;
a first control unit configured to write playback records into the normal storage unit one by one at regular time intervals, each playback record indicating elapsed playback time of the content; and
a second control unit configured to (i) write monitoring records with respect to the playback records into the secure storage unit one by one at randomly-generated time intervals and (ii) determine that the playback records have not been tampered with if a prescribed relation is satisfied between a specific time point obtained according to a latest one of the monitoring records and one of the playback records corresponding to the specific time point;
wherein the prescribed relationship is satisfied when either:
the specific time point matches the elapsed playback time indicated by the corresponding playback record; or
the specific time point is less than the elapsed playback time indicated by the corresponding playback record.

2. The content playback device of claim 1, wherein the prescribed relation is satisfied when the specific time point matches the elapsed playback time indicated by the corresponding playback record.

3. The content playback device of claim 1, wherein the prescribed relation is satisfied when the specific time point is less than the elapsed playback time indicated by the corresponding playback record.

4. The content playback device of claim 1, wherein any of the randomly-generated time intervals is greater than any of the regular time intervals.

5. The content playback device of claim 4, wherein the randomly-generated time intervals are each determined based on random numbers.

6. The content playback device of claim 1, wherein the randomly-generated time intervals vary according to a predetermined rule, and
the number of the monitoring records written into the secure storage unit by the second control unit at the randomly-generated time intervals during a certain time period is less than the playback records written into the normal storage unit by the first control unit at the regular time intervals during the time period.

7. The content playback device of claim 1, wherein the second control unit is tamper-resistant,
the monitoring records written into the secure storage unit are each counter information indicating an order in which the monitoring records have been written, and
the second control unit obtains the specific time point based on the randomly-generated time intervals and the counter information.

8. The content playback device of claim 1, wherein the secure storage unit stores a variety of randomly-generated time intervals in advance, and
the second control unit selects one of the randomly-generated time intervals each time the second control unit writes a monitoring record into the secure storage unit.

9. The content playback device of claim 1, wherein the second control unit determines each of the randomly-generated time intervals prior to playback of the content.

10. The content playback device of claim 1, wherein the second control unit determines each of the randomly-generated time intervals during playback of the content.

11. The content playback device of claim 1, wherein the second control unit continuously determines the relation between the specific time point and the corresponding playback record and varies the randomly-generated time intervals on each determination.

12. The content playback device of claim 1, further comprising
a right consumption processing unit configured to perform predetermined processing when accumulated playback time of the content is greater than a predetermined time, wherein when the prescribed relation is satisfied, the right consumption processing unit determines whether the accumulated playback time is greater than the predetermined time using the playback records.

13. The content playback device of claim 12, wherein when the prescribed relation is not satisfied, the right consumption processing unit determines whether the accumulated playback time is greater than the predetermined time according to the specific time point.

14. The content playback device of claim 12, wherein the monitoring records in the secure storage unit and the playback records in the normal storage unit are deleted once the right consumption processing unit completes the predetermined processing.

15. The content playback device of claim 1, wherein the second control unit (i) continuously determines the relation between the specific time point and the corresponding playback record, (ii) deletes, on each determination, all specific time points obtained according to the monitoring records in the secure storage unit but the specific time point used in a previous determination, and (iii) deletes all the playback records in the normal storage unit but the playback record used in the previous determination.

16. The content playback device of claim 1, wherein the first control unit writes a playback record together with a type of playback processing performed at the corresponding elapsed playback time into the normal storage unit at the regular time intervals, and the second control unit (i) selects some of the playback records corresponding to specific types of the playback processing and (ii) determines the relation between the specific time point and one of the selected playback records corresponding to the specific time point.

17. The content playback device of claim 1, further comprising
a normal clock configured to measure elapsed time, wherein
the second control unit determines the relation with reference to the normal clock.

18. The content playback device of claim 1, further comprising
a normal clock configured to measure elapsed time, wherein
the second control unit determines time intervals at which the normal clock measures the elapsed time and notifies the determined time intervals to the first control unit,
the first control unit writes playback records into the normal storage unit at the regular time intervals as notified by the second control unit.

19. A method for controlling a content playback device, the method comprising:
providing the content playback device including:
a playback unit configured to play back a content;
a normal storage unit that is not tamper-resistant; and
a secure storage unit that is tamper-resistant;
writing playback records into the normal storage unit one by one at regular time intervals using a first control unit, each playback record indicating elapsed playback time of the content;
writing monitoring records with respect to the playback records into the secure storage unit one by one at randomly-generated time intervals using a second control unit; and
determining in the second control unit that the playback records have not been tampered with if a prescribed relation is satisfied between a specific time point obtained according to a latest one of the monitoring records and one of the playback records corresponding to the specific time point.

20. A content playback system comprising:
a content playback device including:
a playback unit configured to play back a content;
a normal storage unit that is not tamper-resistant;
a secure storage unit that is tamper-resistant;
a first control unit configured to write playback records into the normal storage unit one by one at regular time intervals, each playback record indicating elapsed playback time of the content; and
a second control unit configured to write monitoring records with respect to the playback records into the secure storage unit one by one at randomly-generated time intervals, and
a content playback program embodied on a non-transitory computer readable recording medium, the content playback program being configured to cause the second control unit to perform processing for determining that the playback records have not been tampered with if a prescribed relation is satisfied between a specific time point obtained according to a latest one of the monitoring records and one of the playback records corresponding to the specific time point.

21. A non-transitory computer readable recording medium storing a content playback program used in a content playback device, wherein the content playback device includes: a playback unit configured to play back a content; a normal storage unit that is not tamper-resistant; and a secure storage unit that is tamper-resistant; said program when executed on a processor performing the method comprising:
writing playback records into the normal storage unit one by one at regular time intervals using a first control unit, each playback record indicating elapsed playback time of the content;
writing monitoring records with respect to the playback records into the secure storage unit one by one at randomly-generated time intervals using a second control unit, the content playback program: and
determining using the second control unit that the playback records have not been tampered with if a prescribed relation is satisfied between a specific time point obtained according to a latest one of the monitoring records and one of the playback records corresponding to the specific time point.

22. A integrated circuit used in a content playback device that plays back a content, comprising:
a playback unit configured to play back a content;
a normal storage unit that is not tamper-resistant;
a secure storage unit that is tamper-resistant;
a first control unit configured to write playback records into the normal storage unit one by one at regular time intervals, each playback record indicating elapsed playback time of the content; and
a second control unit configured to (i) write monitoring records with respect to the playback records into the secure storage unit one by one at randomly-generated time intervals and (ii) determine that the playback records have not been tampered with if a prescribed relation is satisfied between a specific time point obtained according to a latest one of the monitoring records and one of the playback records corresponding to the specific time point.

23. A content playback device, comprising:
a playback unit configured to play back a content;
a normal storage unit that is not tamper-resistant;

a secure storage unit that is tamper-resistant;
a first control unit configured to write playback records into the normal storage unit one by one at first time intervals, each playback record indicating elapsed playback time of the content; and
a second control unit configured to (i) write monitoring records with respect to the playback records into the secure storage unit one by one at second time intervals greater than the first time intervals and (ii) determine that the playback records have not been tampered with if a prescribed relation is satisfied between a specific time point obtained according to a latest one of the monitoring records and one of the playback records corresponding to the specific time point.

* * * * *